US008606638B2

(12) United States Patent
Dragt

(10) Patent No.: US 8,606,638 B2
(45) Date of Patent: Dec. 10, 2013

(54) SYSTEMS, METHODS AND APPARATUS FOR FACILITATING TRANSACTIONS USING A MOBILE DEVICE

(75) Inventor: Bruce Dragt, Marietta, GA (US)

(73) Assignee: First Data Corporation, Greenwood Village, CO (US)

(*) Notice: Subject to any disclaimer, the term of this patent is extended or adjusted under 35 U.S.C. 154(b) by 116 days.

(21) Appl. No.: 12/396,265

(22) Filed: Mar. 2, 2009

(65) Prior Publication Data
US 2010/0223145 A1 Sep. 2, 2010

(51) Int. Cl.
G06Q 20/00 (2012.01)

(52) U.S. Cl.
USPC ............................................ 705/17; 705/26.1

(58) Field of Classification Search
USPC ............. 235/379, 380; 455/406, 557; 705/16, 705/40, 70, 36
See application file for complete search history.

(56) References Cited

U.S. PATENT DOCUMENTS

| 3,209,086 | A | 9/1965 | Boylan |
| 4,368,354 | A | 1/1983 | Furihatd |
| 5,574,962 | A | 11/1996 | Fardeau |
| 5,642,425 | A * | 6/1997 | Kawakami ...................... 381/63 |
| 5,787,334 | A | 7/1998 | Fardeau |
| 5,809,425 | A | 9/1998 | Colwell et al. |
| 6,044,158 | A | 3/2000 | Terpening |
| 6,370,389 | B1 | 4/2002 | Isomursu et al. |
| 6,449,346 | B1 | 9/2002 | Katz |
| 6,597,890 | B1 | 7/2003 | Siebecas |
| 6,598,890 | B2 | 7/2003 | Mears et al. |
| 6,604,085 | B1 | 8/2003 | Brock |
| 6,662,007 | B2 | 12/2003 | Yuen |
| 6,934,684 | B2 | 8/2005 | Alpdemir |
| 7,065,494 | B1 | 6/2006 | Evans |
| 7,092,724 | B2 | 8/2006 | Fellenstein |
| 7,124,937 | B2 * | 10/2006 | Myers et al. .................. 235/380 |
| 7,188,065 | B2 | 3/2007 | Mihcah |
| 7,188,352 | B2 | 3/2007 | Nathan |
| 7,310,522 | B2 | 12/2007 | Geile |
| 7,328,236 | B2 | 2/2008 | Hayek et al. |
| 7,343,317 | B2 | 3/2008 | Jokinen |
| 7,433,452 | B2 * | 10/2008 | Taylor et al. ............... 379/93.12 |
| 7,460,991 | B2 | 12/2008 | Jones et al. |
| 7,463,898 | B2 | 12/2008 | Bayne |
| 7,487,362 | B2 | 2/2009 | Steenstra |

(Continued)

OTHER PUBLICATIONS

Hafner, Katie. "Wireless Payment Systems might Mean Dialing Inot Your Own Wallet." New York Times: O. Mar. 2, 2000. Hoover's Company Profiles; ProQuest Central. Web. Jan. 13, 2013 (Attached).*

(Continued)

*Primary Examiner* — Matthew Gart
*Assistant Examiner* — Rokib Masud
(74) *Attorney, Agent, or Firm* — Sutherland Asbill & Brennan LLP

(57) ABSTRACT

Systems, methods and apparatus for facilitating transactions using a mobile device are provided by certain embodiments of the invention. Information associated with a proposed transaction may be received at a mobile device from a point of sale device. The mobile device may communicate a request to approve the proposed transaction to a transaction processor. The request may at least a portion of the received information and an identifier associated with the mobile device. The transaction processor may determine whether to approve the proposed transaction and communicate an approval or decline message to the point of sale device.

21 Claims, 7 Drawing Sheets

(56) References Cited

U.S. PATENT DOCUMENTS

| | | | |
|---|---|---|---|
| 7,505,922 | B1 | 3/2009 | Philyaw |
| 7,721,958 | B2 | 5/2010 | Belfer et al. |
| 2002/0010621 | A1 | 1/2002 | Bell |
| 2002/0095333 | A1 | 7/2002 | Jokinen et al. |
| 2002/0120501 | A1 | 8/2002 | Bell |
| 2002/0126813 | A1 | 9/2002 | Partovi |
| 2002/0133818 | A1 | 9/2002 | Rottger |
| 2003/0028601 | A1 | 2/2003 | Rowe |
| 2003/0200184 | A1 | 10/2003 | Dominguez et al. |
| 2004/0133789 | A1 | 7/2004 | Gantman |
| 2005/0105725 | A1 | 5/2005 | Lee |
| 2005/0124351 | A1 | 6/2005 | Black |
| 2006/0014569 | A1 | 1/2006 | DelGiorno |
| 2006/0084488 | A1 | 4/2006 | Kinsley |
| 2006/0174274 | A1 | 8/2006 | Vance et al. |
| 2006/0240808 | A1 | 10/2006 | Crolley |
| 2007/0063027 | A1 | 3/2007 | Belfer et al. |
| 2007/0078709 | A1 | 4/2007 | Rajaram |
| 2007/0179853 | A1 | 8/2007 | Feige et al. |
| 2007/0187482 | A1 | 8/2007 | Castro |
| 2007/0189474 | A1 | 8/2007 | Cai |
| 2007/0297455 | A1 | 12/2007 | McParland |
| 2008/0010215 | A1* | 1/2008 | Rackley, III et al. ............ 705/70 |
| 2008/0019706 | A1 | 1/2008 | Levinson |
| 2008/0065507 | A1 | 3/2008 | Morrison |
| 2008/0114481 | A1* | 5/2008 | Braithwaite et al. ............ 700/94 |
| 2008/0152138 | A1 | 6/2008 | Chiu |
| 2008/0215436 | A1 | 9/2008 | Roberts |
| 2008/0262928 | A1 | 10/2008 | Michaelis |
| 2009/0076912 | A1 | 3/2009 | Rajan et al. |
| 2009/0143057 | A1 | 6/2009 | Arun et al. |
| 2009/0249388 | A1 | 10/2009 | Seidel et al. |
| 2010/0030838 | A1 | 2/2010 | Atsmon et al. |
| 2010/0106647 | A1 | 4/2010 | Raman |
| 2010/0211431 | A1 | 8/2010 | Lutnick |
| 2010/0222026 | A1 | 9/2010 | Dragt et al. |
| 2010/0222037 | A1 | 9/2010 | Dragt et al. |
| 2010/0222038 | A1 | 9/2010 | Dragt et al. |
| 2010/0222041 | A1 | 9/2010 | Dragt et al. |
| 2010/0222043 | A1 | 9/2010 | Dragt et al. |
| 2010/0222072 | A1 | 9/2010 | Dragt et al. |
| 2010/0222087 | A1 | 9/2010 | Dragt et al. |
| 2010/0222088 | A1 | 9/2010 | Dragt et al. |
| 2010/0222100 | A1 | 9/2010 | Dragt et al. |
| 2010/0223120 | A1 | 9/2010 | Dragt et al. |
| 2010/0223138 | A1 | 9/2010 | Dragt et al. |
| 2010/0223346 | A1 | 9/2010 | Dragt et al. |
| 2010/0226526 | A1 | 9/2010 | Modro et al. |

OTHER PUBLICATIONS

Disclosure Under 37 C.F.R. 1.56 (3 pages).
"Hearing Test—Can you Hear It?" Freemosquitoringtones.org. <http://www.freemosquitoringtones.org/hearing_test>. (4 pages).
Christensen-Dalsgaard, Jakob. "Center for Sound Communicaiton". Biology.sdu.dk. Oct. 17, 2000. Sep. 22, 2008. <http://www.biology.sdu.dk/Center_for_Lydkommunikation/gb/CSChome-eng.html>. (3 pages).
"Shazam on iPhone". Shazam.com. <http://www.shazam.com/music/web/pages/iphone.html>. (4 pages).
"Background". Shazam.com. <http://www.shazam.com/music/web/pages/background.html>. (1 page).
"FAQs—Mosquito Teen Deterrent". Compoundsecurity.co.uk. <http://www.compoundsecurity.co.uk/faqs>. (1 page).
Vitello, Paul. (Jun. 12, 2006). "A Ring Tone Meant to Fall on Deaf Ears." New York Times. Retrieved from http://www.nytimes.com. (4 pages).
"Radio Receiption on the Move and RDS (Radio Data System)". bbc.com. <http://www.bbc.co.uk/reception/info/pdf/factsheet_radiomove_rds.html>. (3 pages).
Non-final Office Action for U.S. Appl. No. 12/396,241 mailed Apr. 14, 2011.
Non-final Office Action for U.S. Appl. No. 12/396,261 mailed Apr. 26, 2011.
Non-final Office Action for U.S. Appl. No. 12/396,259 mailed Apr. 27, 2011.
Non-final Office Action for U.S. Appl. No. 12/396,268 mailed May 3, 2011.
Non-final Office Action for U.S. Appl. No. 12/396,255 mailed May 23, 2011.
Non-final Office Action for U.S. Appl. No. 12/396,240 mailed May 25, 2011.
Non-final Office Action for U.S. Appl. No. 12/396,258 mailed Jun. 8, 2011.
Non-final Office Action for U.S. Appl. No. 12/396,256 mailed Jul. 8, 2011.
Non-final Office Action for U.S. Appl. No. 12/396,248 mailed Aug. 30, 2011.
Non-final Office Action for U.S. Appl. No. 12/396,271 mailed Sep. 15, 2011.
Non-final Office Action for U.S. Appl. No. 12/396,263 mailed Sep. 16, 2010.
Final Office Action for U.S. Appl. No. 12/396,263 mailed Feb. 10, 2011.
Non-final Office Action for U.S. Appl. No. 12/396,242 mailed Aug. 3, 2011.
Final Office Action for U.S. Appl. No. 12/396,259 mailed Oct. 21, 2011.
Final Office Action for U.S. Appl. No. 12/396,240 mailed Nov. 2, 2011.
Final Office Action for U.S. Appl. No. 12/396,258 mailed Nov. 4, 2011.
Final Office Action fo U.S. Appl. No. 12/396,248 mailed Dec. 21, 2011.
Non-final Office Action for U.S. Appl. No. 12/396,258 mailed Feb. 16, 2012.
Non-final Office Action for U.S. Appl. No. 12/396,259 mailed Feb. 16, 2012.
Final Office Action for U.S. Appl. No. 12/396,259 mailed Aug. 8, 2012.
Final Office Action for U.S. Appl. No. 12/396,258 mailed Aug. 9, 2012.
Notice of Allowance for U.S. Appl. No. 12/396,259 mailed Mar. 13, 2013.
Notice of Allowance for U.S. Appl. No. 12/396,258 mailed Mar. 25, 2013.
Non-final Office Action for U.S. Appl. No. 12/396,248 mailed Jun. 18, 2013.

* cited by examiner

SYSTEMS, METHODS AND APPARATUS FOR FACILITATING TRANSACTIONS USING A MOBILE DEVICE

CROSS-REFERENCE TO RELATED APPLICATIONS

This application is related to U.S. patent application Ser. No. 12/396,241, filed Mar. 2, 2009 and entitled "Systems, Methods, and Devices for Administering Consumer Rewards Programs Through the Use of Tones Sent to Mobile Devices"; U.S. patent application Ser. No. 12/396,258, filed Mar. 2, 2009 and entitled "Systems, Methods, and Apparatus for Providing Promotion Information to a Mobile Device"; U.S. patent application Ser. No. 12/396,240, filed Mar. 2, 2009 and entitled "Systems, Methods, and Apparatus for Marketing by Communicating Tones to a Mobile Device"; U.S. patent application Ser. No. 12/396,255, filed Mar. 2, 2009 and entitled "Systems, Methods, and Apparatus for Communicating Information to a Mobile Device in a Broadcast Signal"; U.S. patent application Ser. No. 12/396,261, filed Mar. 2, 2009 and entitled "Systems, Methods, and Apparatus for Facilitating Communication Between Mobile Devices"; U.S. patent application Ser. No. 12/396,248, filed Mar. 2, 2009 and entitled "Systems, Methods, and Devices for Prompting Mobile Device Users for Feedback Information Using Tone Transmissions"; U.S. patent application Ser. No. 12/396,242, filed Mar. 2, 2009 and entitled "Systems, Methods, and Apparatus for Providing Terms and Conditions and Program Enrollment Information to a Mobile Device"; U.S. patent application Ser. No. 12/396,256, filed Mar. 2, 2009 and entitled "Systems, Methods, and Devices for Communicating Supplemental Information to Mobile Devices"; U.S. patent application Ser. No. 12/396,268, filed Mar. 2, 2009 and entitled "Systems, Methods, and Apparatus for Receiving Information by a Mobile Device"; U.S. patent application Ser. No. 12/396,271, filed Mar. 2, 2009 and entitled "Systems, Methods, and Apparatus for Providing Information to a Mobile Device"; U.S. patent application Ser. No. 12/396,259, filed Mar. 2, 2009 and entitled "Systems, Methods, and Apparatus for Receiving Promotion Information by a Mobile Device"; and U.S. patent application Ser. No. 12/396,263, filed Mar. 2, 2009 and entitled "Systems, Methods, and Devices for Processing Feedback Information Received from Mobile Devices Responding to Tone Transmissions." Each of these applications is incorporated by reference herein in its entirety.

FIELD OF THE INVENTION

Embodiments of the invention relate generally to payment transactions, and more particularly, to systems, methods, and apparatus for facilitating payment transactions using a mobile device.

BACKGROUND OF THE INVENTION

A wide variety of non-cash payment instruments are utilized to complete payment transactions. Examples of conventional payment instruments include checks, stored value cards, credit cards, and debit cards. In a typical payment transaction, a customer presents a payment instrument to a merchant at a point of sale. The merchant collects information, including an account number, from the payment instrument. The account number is typically transmitted along with other transaction information, such as a transaction amount, to a transaction processor for approval. The transaction processor typically makes a determination as to whether the payment transaction should be accepted or declined and transmits an approved or declined message to the merchant.

The collection of an account number by a merchant in typical payment transactions may lead to security risks. For example, the account number may be misappropriated by the merchant or an employee of the merchant. As another example, the account number may be intercepted during its transmission to the transaction processor by the merchant, which may lead to a fraudulent transaction conducted by the intercepting party. Although attempts have been made to protect the transmission of an account number, such as the utilization of various types of encryption, there is still some risk associated with transmitting the account number or even a portion of the account number. Additionally, there is a risk associated with a consumer sharing an account number with a merchant.

Therefore, a need exists in the art for systems, methods, and apparatus for addressing some or all of the shortcomings and limitations of existing payment transaction techniques.

BRIEF DESCRIPTION OF THE INVENTION

Some or all of the above needs and/or problems may be addressed by certain embodiments of the invention. Embodiments of the invention may include systems, methods, and apparatus for facilitating transactions using a mobile device. In one embodiment, a method for requesting the completion of a payment transaction by a mobile device is provided. Information associated with a proposed transaction may be received at a mobile device from a point of sale device. The mobile device may communicate a request to approve the proposed transaction to a transaction processor. The request may include at least a portion of the received information and an identifier associated with the mobile device. Upon receipt of the request, the transaction processor may determine whether to approve the proposed transaction and communicate an approval or decline message to the point of sale device.

In accordance with another embodiment of the invention, a mobile device operable to facilitate the completion of a payment transaction may be provided. The mobile device may include at least one input device, at least one communications interface, and at least one processor. The at least one input device may be operable to receive, from a point of sale device, information associated with a proposed transaction. The at least one communications interface may be operable to communicate a request to approve the proposed transaction to a transaction processor. The at least one processor may be operable to utilize at least a portion of the received information associated with a proposed transaction and an identifier associated with the mobile device to generate the request to approve the proposed transaction. The at least one processor may further be operable to direct the communication of the generated request to the transaction processor. Upon receipt of the request, the transaction processor may determine whether to approve the proposed transaction and communicate an approval or decline message to the point of sale device. In certain embodiments of the invention, the at least one input device and the at least communications interface may be the same device.

According to another embodiment of the invention, a method for facilitating a payment transaction requested by a mobile device may be provided. A request to approve a proposed transaction may be received at a transaction processor from a mobile device. The request may include an identifier associated with the mobile device and transaction information received by the mobile device from a point of sale device. A payment account to be utilized for the proposed transaction may be identified. A determination as to whether to approve the proposed transaction may be made based at least in part on the received transaction information and an approval or decline message may be communicated to the point of sale device.

According to yet another embodiment of the invention, a system for facilitating a payment transaction requested by a mobile device may be provided. The system may include at least one communications interface and at least one processor. The at least one communications interface may be operable to receive, from a mobile device, a request to approve a proposed transaction. The received request may include an identifier associated with the mobile device and transaction information received by the mobile device from a point of sale device. The at least one communications interface may further be operable to communicate an approval or decline message to the point of sale device. The at least one processor may be operable to identify a payment account to be utilized for the proposed transaction and to determine, based at least in part on the received transaction information, whether to approve the proposed transaction. The at least one processor may further be operable to direct the communication of the approval or decline message to the point of sale device.

According to yet another embodiment of the invention, a method for facilitating transactions with a mobile device is provided. Information associated with a proposed transaction may be received at a mobile device from a tone transmission device. The information may include an identifier associated with a merchant. The mobile device may communicate a request to approve the proposed transaction to a transaction processor. The request may include at least a portion of the received information and an identifier associated with the mobile device. Upon receipt of the request, the transaction processor may determine whether to approve the proposed transaction and communicate an approval or decline message to the merchant.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
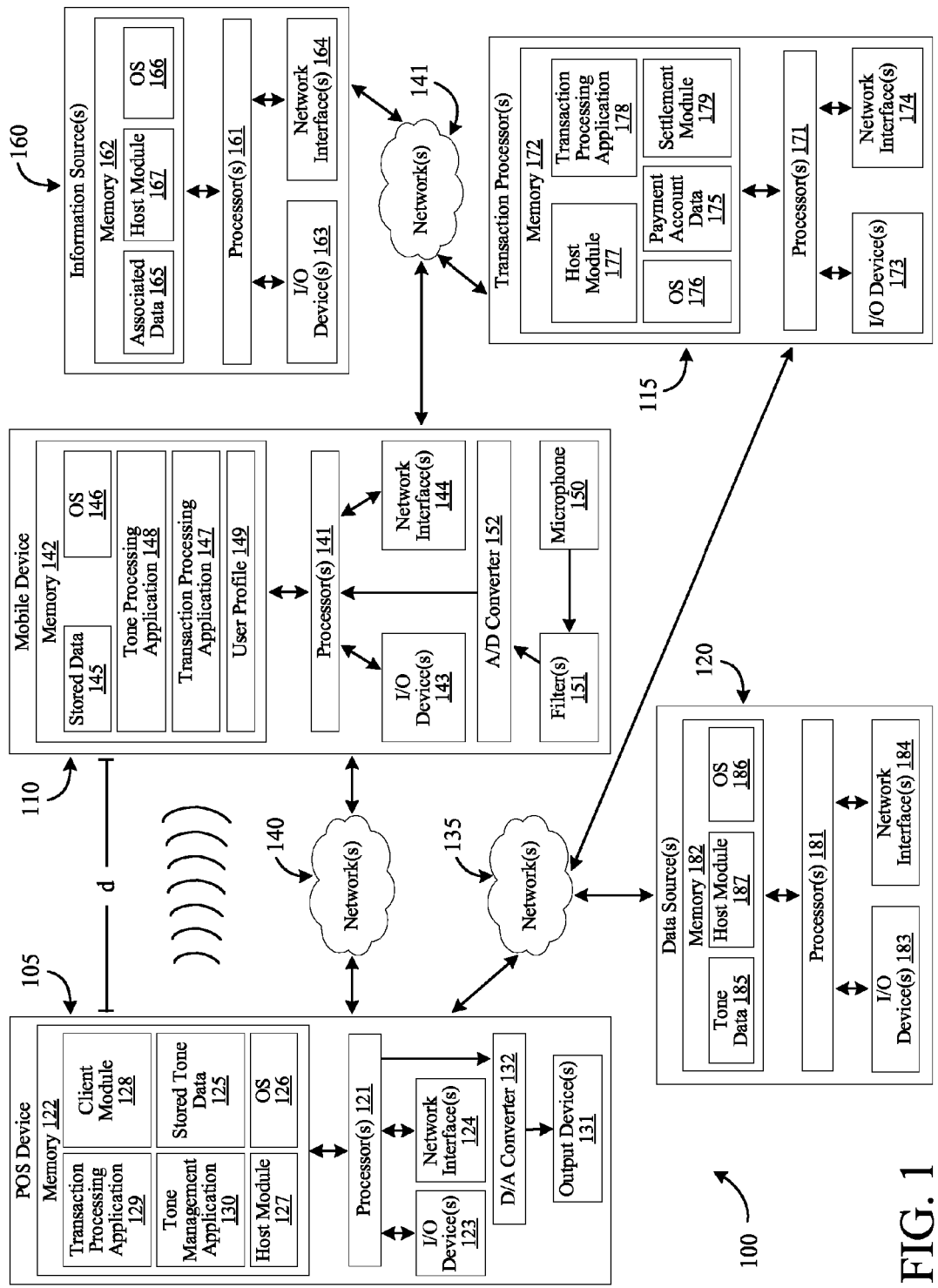

Having thus described the invention in general terms, reference will now be made to the accompanying drawings, which are not necessarily drawn to scale, and wherein:

FIG. 1 is a schematic diagram of one example system that may facilitate a payment transaction utilizing a mobile device, according to an illustrative embodiment of the invention.

Figure 2:
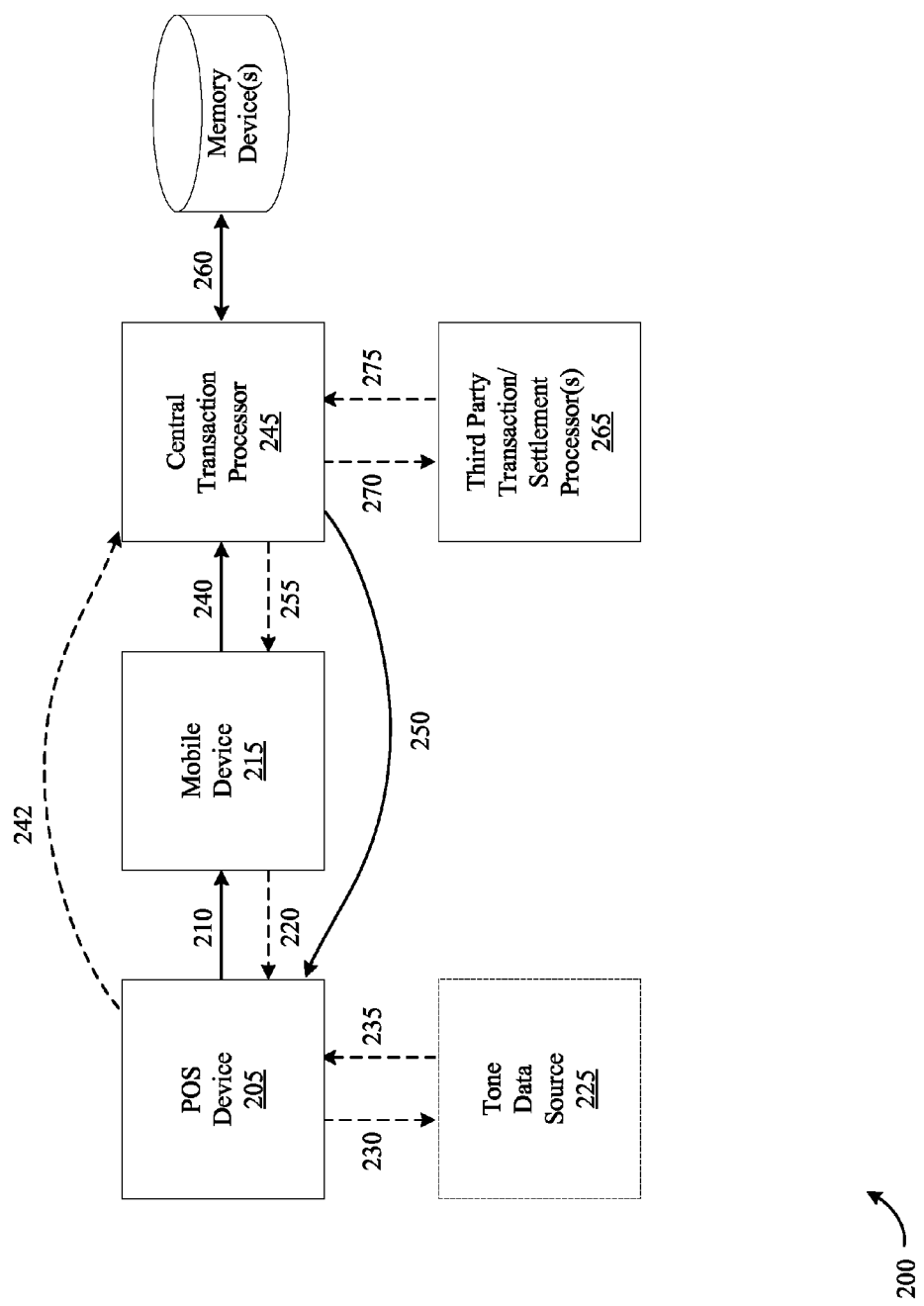

FIG. 2 is a diagram of one example data flow of transmitting transaction information to a mobile device and requesting approval of the transaction by the mobile device, according to an illustrative embodiment of the invention.

Figure 3:
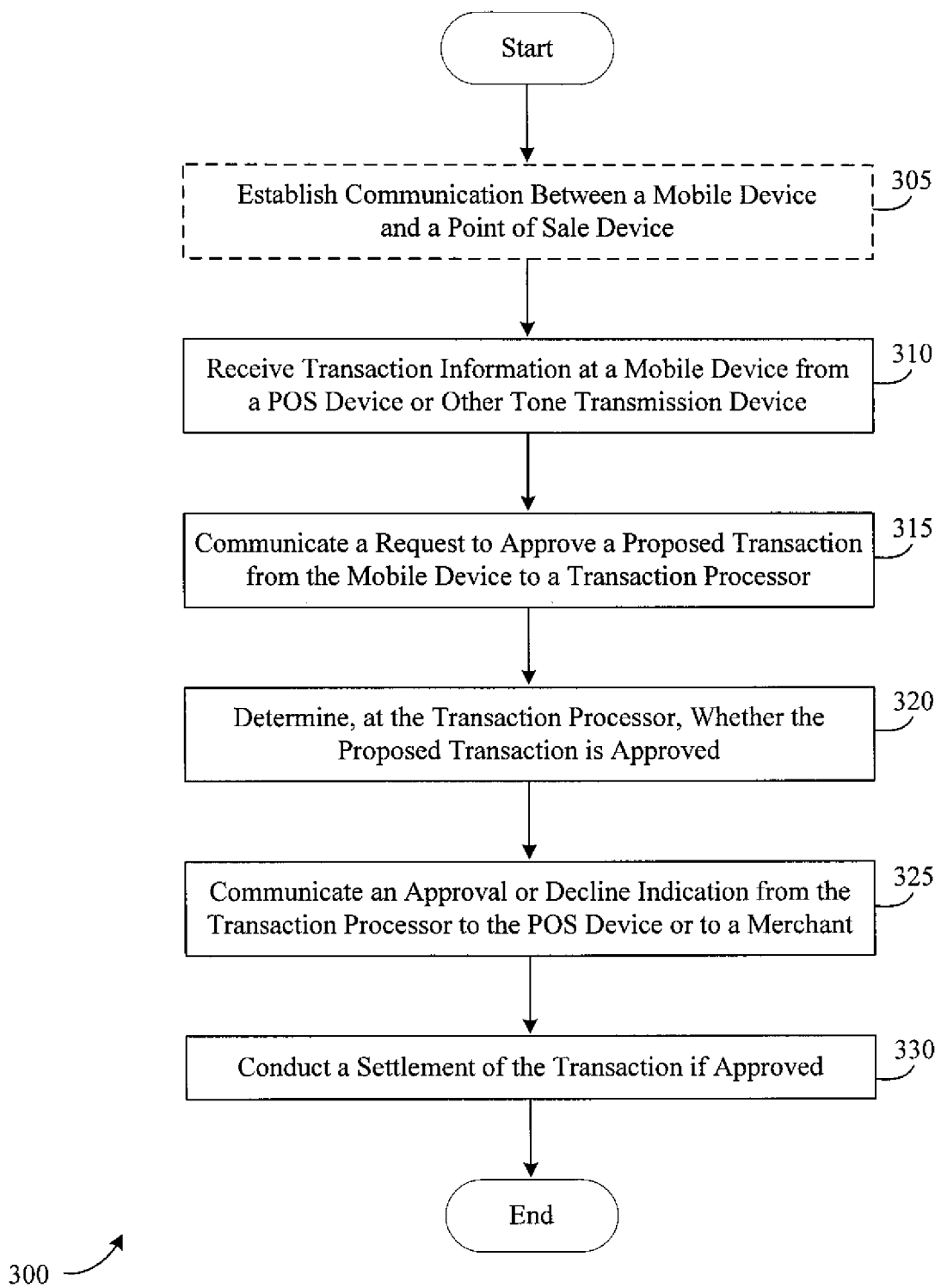

FIG. 3 is a flow chart of one example method of facilitating a payment transaction in accordance with an illustrative embodiment of the invention.

Figure 4:
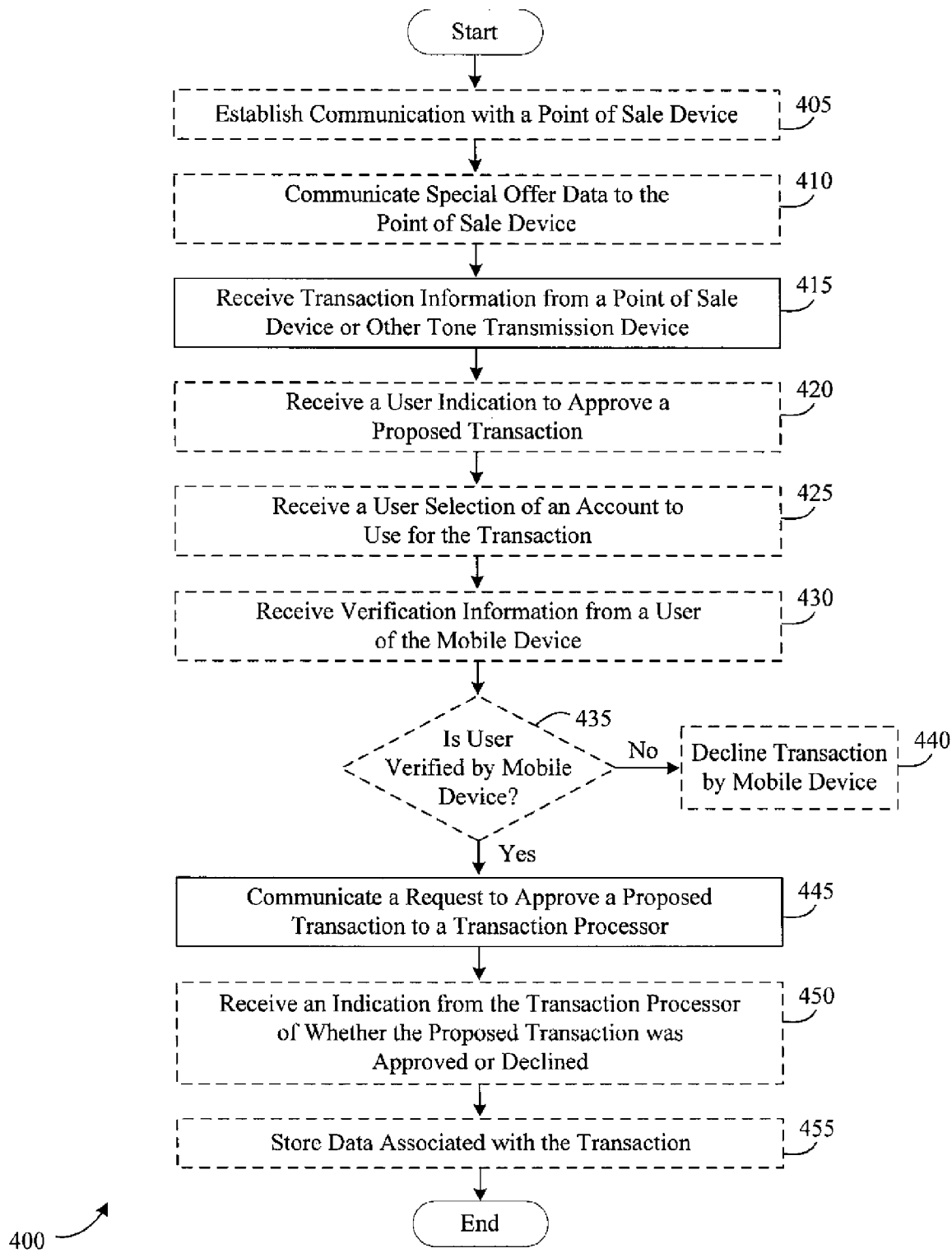

FIG. 4 is a flow chart of one example method of requesting a payment transaction utilizing a mobile device, according to an illustrative embodiment of the invention.

Figure 5:
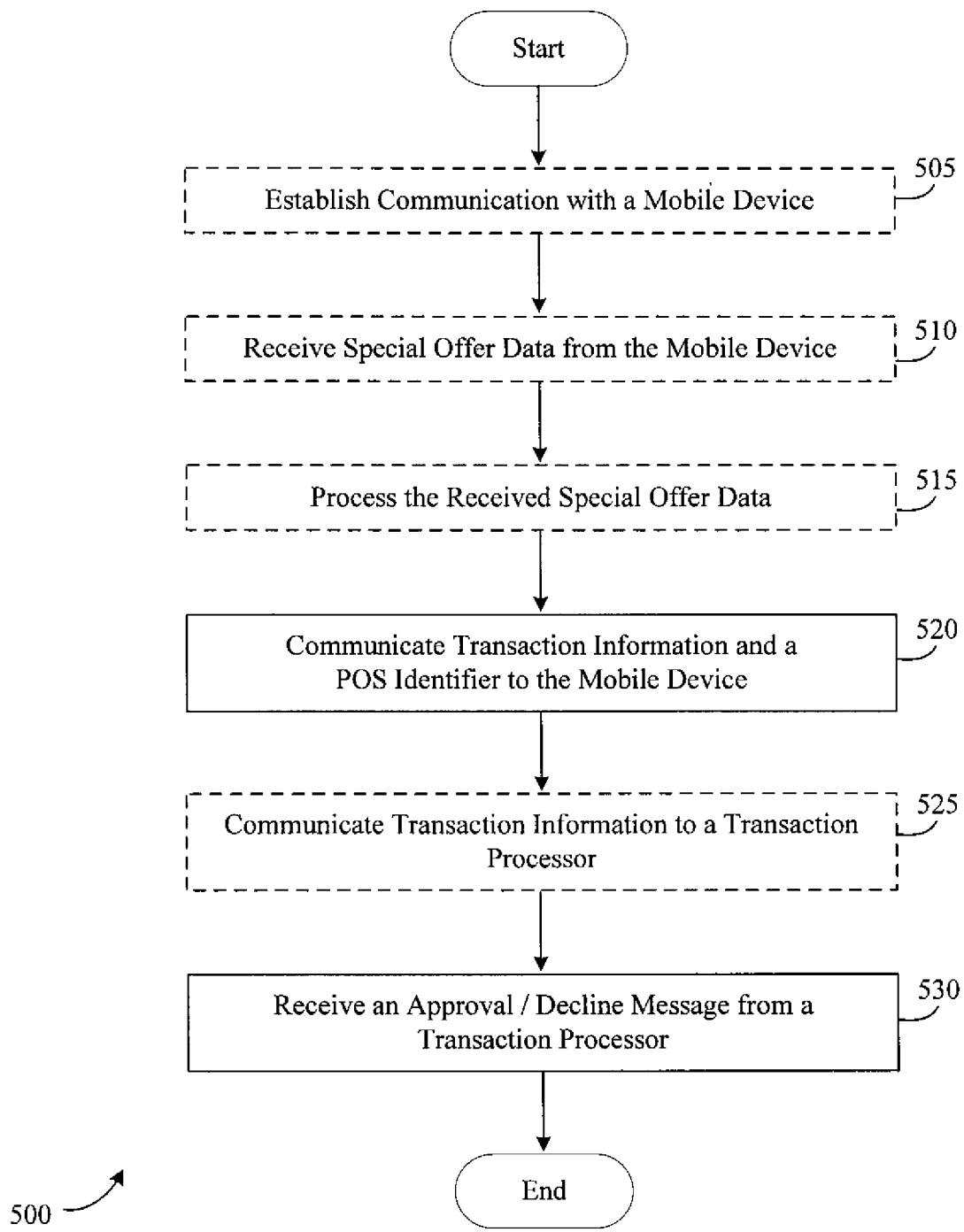

FIG. 5 is a flow chart of one example method of facilitating a payment transaction at a point of sale device, according to an illustrative embodiment of the invention.

Figure 6:
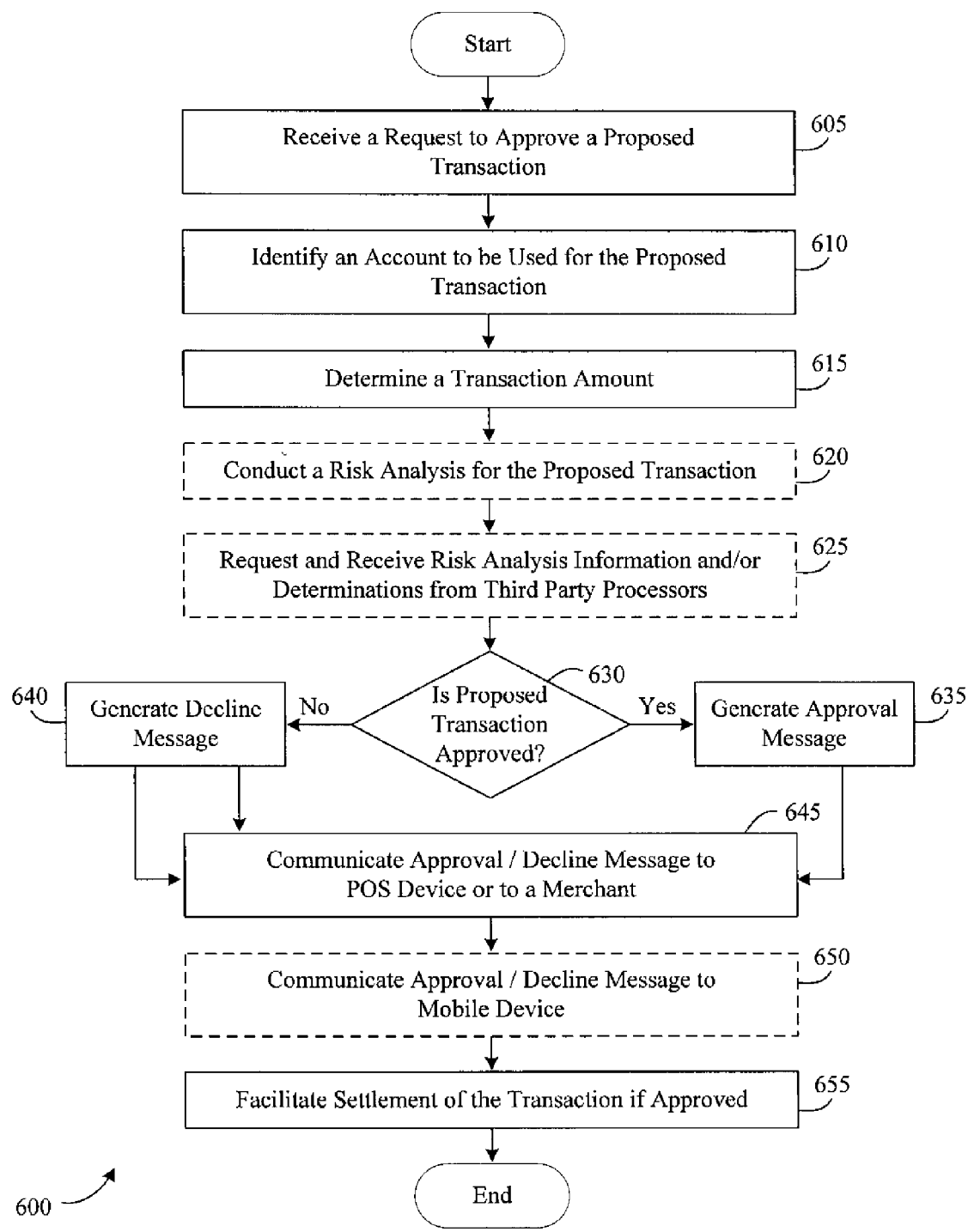

FIG. 6 is a flow chart of one example method of assessing a proposed payment transaction at a transaction processor, according to an illustrative embodiment of the invention.

Figure 7:
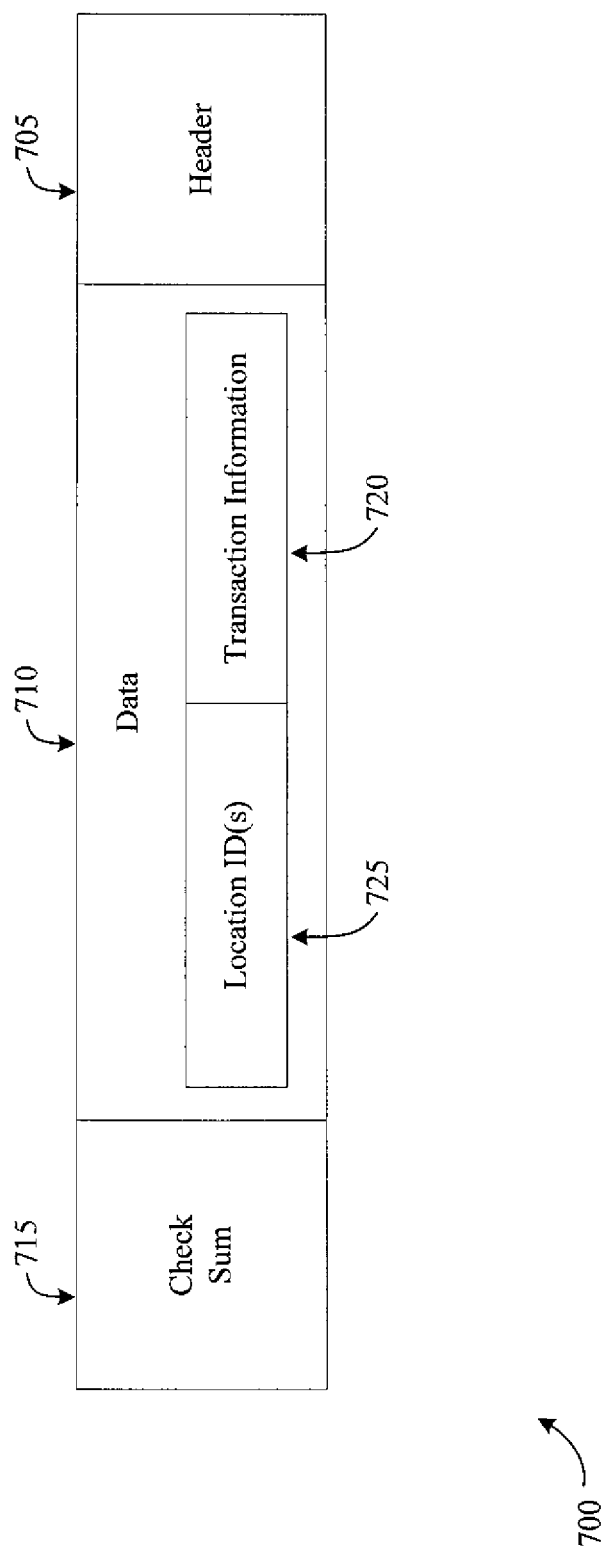

FIG. 7 is a block diagram of data that may be included in an example tone, according to an illustrative embodiment of the invention.

DETAILED DESCRIPTION OF EMBODIMENTS OF THE INVENTION

In accordance with embodiments of the invention, systems and methods for facilitating transactions, including payment transaction, utilizing a mobile device are provided. The widespread use of mobile devices, such as cellular phones or smart phones, provides a new, very effective channel to request the approval of payment transactions and/or other types of transactions. By requesting the approval of a payment transaction with a mobile device, a consumer's sensitive account information, such as an account number, may be safeguarded.

Example embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "payment transaction" may refer to any transaction that may be made by a consumer using a suitable payment account. One example of a payment transaction is a purchase transaction. Additionally, the terms "payment transaction," "transaction," "purchase transaction," and "cashless transaction" may be used interchangeably.

As used herein, the term "payment account" may refer to any suitable account that may be utilized to facilitate and/or complete a payment transaction. Examples of payment accounts include, but are not limited to, credit card accounts, debit card accounts, stored value accounts, and gift card accounts. The terms "payment account," "account," and "transaction account" may be used interchangeably.

As used herein, the term "tone" may refer to a tone carrying information that may be communicated or transmitted to a mobile device by a tone transmission device, such as a point of sale device. A wide variety of methods and/or techniques may be utilized to facilitate the communication of a tone from a point of sale device to a mobile device. In certain embodiments of the invention, a tone may be output by one or more suitable output devices associated with the point of sale device, for example, one or more speakers, and the tone may be received by one or more suitable input devices associated with the mobile device, for example, a microphone. A tone may be a wave, such as an elastic wave, or a primary wave or P-wave, that is propagated between the point of sale device and the mobile device. In certain embodiments of the invention, a tone may be a vibration wave that is propagated through a solid, liquid, or gas. For example, in various embodiments of the invention, a tone may be a sound wave that is emitted or otherwise output by the point of sale device for reception by a mobile device. Tones in accordance with embodiments of the invention may have a wide variety of different frequencies and/or amplitudes as desired. For example, in some embodiments, a tone may be a sound wave that is within a range that may be detected by the human ear, for example, a sound wave with a frequency between approximately 20 hertz and approximately 20 kilohertz. In such an example embodiment of the invention, it may be desirable to have the tone be produced at a frequency range that is not detectable by the naked ear for at least a significant portion of the human population (e.g., a frequency range of 17 kilohertz-20 kilohertz). In other embodiments, a tone may be a sound wave that is outside the normal range that may be detected by the human ear, for example, a sound wave with a frequency above approximately 21 kilohertz. In these embodiments, a tone may be transmitted to a mobile device without being aurally detected by a user of the mobile device. Once received, the tone may be processed by the mobile device to extract the information included in the tone.

As used herein, the term "tone transmission device" may be any device, system, apparatus, or combination thereof that facilitates the communication of a tone to a mobile device. Examples of tone transmission devices include, but are not limited to, devices that are situated within a poster, a billboard, etc., devices that are situated within a retail location (e.g., devices situated on the shelves of a grocery store), mobile devices, radios, televisions, point of sale terminals, other point of sale devices, computers, projectors, etc. The use of a point of sale terminal as a tone transmission device is discussed in greater detail below.

As used herein, the term "mobile device" may refer to any mobile device that is operable to request the completion of a payment transaction. Mobile devices may be devices that are carried by a consumer. Examples of mobile devices include, but are not limited to, cellular phones, iPhones, smart phones, personal digital assistants (PDAs), pagers, digital audio players, handheld portable computers, digital tablets, laptop computers, etc. Additionally, for purposes of this disclosure, the terms "mobile device," "mobile communications device," "mobile phone," "cellular phone," and "cell phone" may be used interchangeably. In certain embodiments of the invention, a mobile device may be operable to receive one or more tones from a tone transmission device, such as a point of sale terminal. The receipt of tones from a point of sale terminal or other tone transmission device may facilitate the request of a transaction by the mobile device.

In accordance with example embodiments of the invention, systems, methods and apparatus for facilitating transactions using a mobile device may be provided. Transaction information may be received at a mobile device. The transaction information may be received in a wide variety of ways. For example, transaction information may be received from a tone transmission device. As another example, transaction information may be received from a point of sale device, which may or may not be a tone transmission device. The mobile device may generate a request to approve a proposed transaction, and the generated request may be communicated to a transaction processor. The generated request may include an identifier associated with the mobile device and at least a portion of the received transaction information, for example, a transaction amount and an identifier associated with a point of sale device or a merchant. The transaction processor may determine whether to approve or deny the proposed transaction. Based at least in part on the determination, the transaction processor may communicate an approval or decline indication to the point of sale terminal or to another system, device, or network component associated with the merchant. In accordance with an aspect of the invention, a proposed transaction is requested by a mobile device rather than by a merchant. In this regard, sensitive information, for example, account information associated with a consumer, may be safeguarded.

A wide variety of different systems may be utilized as desired in various embodiments of the invention to communicate transaction information to a mobile device to facilitate a transaction. One example system is discussed below with reference to FIG. 1.

FIG. 1 is a schematic diagram of one example system 100 that may facilitate the completion of a transaction utilizing a mobile device 110, according to an illustrative embodiment of the invention. The system 100 may include a point of sale device 105, a mobile device 110, and a transaction processor 115.

The point of sale device 105 may be any suitable or appropriate device or system that facilitates the communication of transaction information to a mobile device 110. Transaction information may be any information associated with a proposed transaction or transaction offer. For example, the point of sale device 105 may be a point of sale terminal located at a merchant location. The transaction information output by the point of sale device 105 may be associated with products or services that are being purchased by a user of the mobile device 110 at a merchant location. As another example, the point of sale device 105 may be any suitable tone transmission device that is operable to communicate transaction information to a mobile device 110 utilizing one or more tones. In embodiments of the invention that utilize a tone transmission device as a point of sale device 105, the tone transmission device may be situated or placed in a wide variety of different locations or environments as desired. For example, a tone transmission device may be incorporated into or situated proximate to a poster, billboard, sign, or other advertisement. Transaction information output by the tone transmission device may be associated with the purchase of a product or service that is referenced by the poster, billboard, sign, or other advertisement. As another example, the tone transmission device may be a mobile device that is operable to communicate transaction information to another mobile device 110. As another example, the tone transmission device may be a portable audio device (e.g., iPod, portable radio, etc.), a radio, a television, or other device that is capable of outputting transaction information to a mobile device utilizing one or more tones.

The point of sale device 105 may be a processor driven device that facilitates the outputting and communication of transaction information that may be received by a mobile device 110. In certain embodiments, the point of sale device 105 may further facilitate the receipt of an indication that a proposed transaction is approved or declined. For example, the point of sale device 105 may include any number of special purpose computers or other particular machines, application specific circuits, microcontrollers, personal computers, minicomputers, and the like. In certain embodiments, the operations of the point of sale device 105 may be controlled by computer-executed or computer-implemented instructions that are executed by one or more processors associated with the point of sale device 105. The instructions may be embodied in one or more software components as desired in various embodiments of the invention. The execution of the instructions may form a special purpose computer or other particular machine that is operable to communicate transaction information to a mobile device 110. The one or more processors that control the operations of the point of sale device 105 may be incorporated into the point of sale device 105 and/or in communication with the point of sale device 105 via one or more suitable networks. In certain embodiments of the invention, the operations and/or control of the point of sale device 105 may be distributed amongst several processing components.

The point of sale device 105 may include one or more processors 121, one or more memory devices 122, one or more input/output ("I/O") device(s) 123 or I/O interface(s), and one or more network interface(s) 124. The one or more memory devices 122 may be any suitable memory devices, for example, caches, read only memory devices, random access memory devices, magnetic storage devices, etc. The one or more memory devices 122 may store data, executable instructions, and/or various program modules utilized by the point of sale device 105, for example, stored tone data 125 utilized to facilitate a transaction, an operating system 126, a host module 127, a client module 128, a transaction processing application 129, and/or a tone management application 130. The stored tone data 125 may include any data that is utilized to facilitate the completion of a transaction, for example, stored transaction data. A wide variety of transaction data may be utilized as desired in various embodiments of the invention, for example, one or more identifiers of products and/or services that are offered for purchase, one or more identifiers of products and/or services that are being purchased, prices of products and/or services, a total proposed transaction amount, an identifier of the merchant, an identifier of the POS device 105, account information associated with a merchant, etc. In some embodiments of the invention, a portion or all of the transaction information may be stored as tone data that may be output to a mobile device 110 in one or more tones. Stored tone data may include any stored data associated with a tone that is output by the point of sale device 105. For example, tone data may include stored digital data associated with a tone, such as a Waveform audio format (WAV) file, MPEG-1 Audio Layer 3 (MP3) file, Moving Picture Experts Group (MPEG) file, Audio Interchange File Format (AIFF) file, Advanced Audio Coding (AAC) file, Apple Lossless file, or other digital media file format. As another example, stored tone data may include stored analog data associated with a tone, for example, magnetically stored analog data. Additionally, in certain embodiments of the invention, data associated with a tone may be generated or received by the point of sale device 105 and output by the point of sale device 105 without being stored in one or more memory devices 122. Furthermore, in some embodiments of the invention, such as when a radio or television serves as a tone transmission device that outputs transaction information, the tone transmission device does not include one or more memory devices 122 operable to store tone data and/or other transaction information.

In certain embodiments of the invention, the point of sale device 105 may include one or more software applications and/or software modules, for example, an operating system 126, a host module 127, a client module 128, a transaction processing application 129, and/or a tone management application 130. In embodiments that include an operating system (OS) 126, the OS may include computer-executable instructions that facilitate the general operation of the point of sale device 105 and/or the execution of other software applications. The host module 127 may include computer-executable instructions that facilitate the hosting of a network session with one or more other network devices, for example, with the mobile device 110. The client module 128 may include computer-executable instructions that facilitate communications via a network session with a host module or host server associated with another device or system, for example, a network session hosted by the mobile device 110, a network session hosted by a data source 120, etc. The transaction processing application 129 may include computer-executable instructions that facilitate the processing of a transaction by the POS device 105. For example, the transaction processing application 129 may facilitate and/or control the receipt of a request for transaction information from a mobile device 110, the generation of transaction information, the communication of transaction information to a mobile device 110, the receipt of a transaction acceptance or decline decision from a transaction processor 115, and/or the receipt of settlement related information from a transaction processor 115 or other system (e.g., financial institution). In embodiments of the invention where transaction information is communicated to a mobile device 110 by one or more tones, the tone management application 130 may include computer-executable instructions that facilitate the management of one or more tones by the POS device 105. For example, the tone management application 130 may facilitate and/or control the receipt of tone data or other information associated with a tone, the generation of tone data, the storage of tone data, the receipt of a request for tone data, the accessing of stored tone data, the conversion of tone data into a form that may be output by the POS device 105, and/or the output of a tone by the POS device 105. In certain embodiments, the conversion of tone data into a form that may be output by the POS device 105 may transform digital tone data into analog data that may be output by one or more suitable output devices, for example, one or more speakers. In certain embodiments of the invention, the tone management application 130, the host module 127, and/or the client module 128 may also facilitate and/or control network communication between the POS device 105 and one or more external devices, such as one or more data sources 120. Although the software components described above are illustrated and described as individual software components, each software component may include any number of software components, modules, and/or applications as desired in various embodiments of the invention. Additionally, one or more of the software components, modules, and/or applications may be combined into a single component, module and/or application.

The one or more I/O devices 123 may facilitate communication between the POS device 105 and one or more input/output devices, for example, a universal serial bus port, a serial port, a disk drive, a CD-ROM drive, an infrared receiver, and/or one or more user interface devices, such as a display, keyboard, keypad, mouse, control panel, touch screen display, bar code scanner, infrared scanner, remote control, microphone, etc. that facilitate user interaction with the POS device 105. The one or more I/O devices 123 may be utilized to receive or collect transaction information and/or tone data from a wide variety of input devices. For example, transaction information may be received from a keypad, keyboard, touch screen, bar code scanner, etc. Following the receipt of transaction information, in certain embodiments, at least a portion of the transaction information may be stored in a memory device 122 associated with the POS device 105. As another example, transaction information may be received as tone data from a portable memory device (e.g., thumb drive, portable hard drive etc.) via the one or more I/O devices 123. Following receipt of tone data via the one or more I/O devices 123, the received tone data may be processed by the tone management application 130 and stored in a memory device 122 associated with the POS device 105. Additionally, in certain embodiments, the one or more I/O devices 123 may be utilized to receive user input from a user of the POS device 105, for example, an employee at a merchant location. In this regard, one or more user preferences associated with the operation of the POS device 105 may be received and processed.

The one or more network interfaces 124 may facilitate connection of the POS device 105 to one or more suitable networks 135, 140, for example, a local area network, a wide area network, the Internet, a telephone network, a broadcast network, a radio frequency network, a cellular network, a Bluetooth enabled network, a Wi-Fi network, any wired network, any wireless network, etc. In this regard, the POS device 105 may receive transaction data, tone data and/or user input data from one or more external devices, network components, and/or systems via the one or more networks 135. For example, the POS device 105 may receive transaction data and/or tone data from one or more data sources 120 via the one or more networks 135. As one example, if the POS device 105 is located at a merchant location, then the POS device 105 may receive transaction information and/or tone data from one or more data sources 120 located at the merchant location via a local area network. As another example, if the POS device 105 is a television, then the POS device 105 may receive tone data in association with a television signal, transmission, or broadcast received via a suitable television network (e.g., broadcast, cable, satellite, Internet, etc.). As yet another example, if the POS device 105 is a radio, then the POS device 105 may receive tone data in association with a radio signal, transmission, or broadcast via a suitable radio network (e.g., broadcast, satellite, Internet, etc.). As yet another example, if the POS device 105 is a mobile device, then the POS device 105 may receive tone data via communication over a cellular network or via an Internet connection.

Additionally, the POS device 105 may receive acceptance or decline determinations from a transaction processor 115 via the one or more networks 135. Similarly, in certain embodiments, the POS device 105 may receive settlement information from one or more suitable settlement entities via the one or more networks 135. Additionally, in certain embodiments, the POS device 105 may communicate with the mobile device 110 via one or more networks 140.

According to an aspect of the invention, the POS device 105 may output transaction information to a mobile device 110. The transaction information may be output to a mobile device 110 via one or more suitable networks 140 and/or via one or more tones that are output for receipt by the mobile device 110. For the output of a tone, the POS device 105 may output the tone via one or more suitable output devices 131, for example, one or more speakers. In certain embodiments of the invention, the tone management application 130 may direct and/or control the access of stored tone data 125 and the processing of the accessed tone data 125 to derive the tone that is output by the one or more output devices 131. For example, stored tone data 125 may be accessed from memory 122 and processed through a digital-to-analog converter 132 to derive the tone that is output by the one or more output devices 131. In this regard, the stored tone data 125 may be transformed into a tone that may be output by the POS device 105 for receipt by a mobile device 110. In other embodiments of the invention, a POS device 105 may receive tone data in a broadcast stream, such as a radio or television broadcast stream, and the POS device 105 may output the tone data as a tone in the audio output of the POS device 105. For example, a television broadcast signal may include embedded tone information that is output by one or more speakers of a television as part of the audio output of the received television broadcast signal.

Following the output of transaction information to a mobile device 110, the mobile device 110 may communicate with a transaction processor 115 to facilitate the approval and/or decline of the transaction. Once an approval or decline determination has been made by the transaction processor 115, the transaction processor may communicate an approval or decline indication or message to the POS device 105 and/or to a system or entity associated with the POS device 105.

In certain embodiments of the invention, the POS device 105 may communicate transaction information associated with a proposed transaction to a transaction processor 115. For example, the POS device 105 may communicate an identifier of the transaction, an identifier of the POS device 105 and/or an amount of the transaction to a transaction processor 115. As desired, the transaction processor 115 may utilize the transaction information received from the POS device 105 to verify and/or validate the proposed transaction. For example, the transaction processor 115 may compare certain transaction information received from a mobile device 110 to corresponding transaction information received from a POS device 105, such as a transaction identifier received from each device, to verify the proposed transaction and/or to validate the request to approve the proposed transaction.

Embodiments of the invention may include POS devices and/or other tone transmission devices with more or less than the components illustrated for the POS device 105 illustrated in FIG. 1. The description of the POS device 105 of FIG. 1 is provided by way of example only and is not intended to be limiting.

Although a point of sale device 105 is illustrated in the system 100 of FIG. 1, transaction information associated with a proposed transaction may be communicated to a mobile device 110 by a wide variety of different devices and/or systems as desired in various embodiments of the invention. Example devices and/or systems include, but are not limited to, radios, televisions, other tone transmission devices, network communication devices, etc.

With continued reference to FIG. 1, the mobile device 110 may be any suitable or appropriate device or system that facilitates the receipt of transaction information and/or tones from a POS device 105 and the processing of the received transaction information and/or tones. In this regard, the mobile device 110 may receive information associated with a proposed transaction via one or more suitable network connections and/or through the receipt of tones. Once transaction information is received by the mobile device 110, the transaction information may be processed by the mobile device 110 in order to request a transaction processor 115 to approve or decline the approved transaction. For the receipt of a tone, once the tone is received by the mobile device 110, the tone may be processed by the mobile device 110 to extract information included in the tone, such as, transaction information and/or one or more location identifiers that reference additional transaction information or other information associated with the tone. The extracted information may be utilized to request a transaction processor to approve or decline a proposed transaction and/or to access one or more information sources to obtain at least a portion of the additional information associated with the tone.

A wide variety of transaction information may be communicated to a mobile device 110 by a POS device 105 or other tone transmission device. Examples of transaction information may include, but are not limited to, an identifier associated with a proposed transaction, an amount associated with a proposed transaction, individual amounts associated with various goods and/or services, a tax amount, a service charge amount, a tip amount, a merchant location, a merchant identifier, a POS identifier, etc. In addition to transaction information, other information may be communicated to the mobile device 110 by a POS device or other tone transmission device, including but not limited to, advertising material, promotions, special offers, rebates, coupons, rewards information, reward points information, customer surveys, ratings information, etc. In certain embodiments, other information, such as a coupon, may be communicated to a mobile device 110 by a tone transmission device and then presented to the POS device 105 and/or to a transaction processor 115 by the mobile device 110.

In accordance with various embodiments of the invention, transaction information and/or other information may be communicated to a mobile device 110 via one or more tones. As desired, the information may be embedded into the one or more tones and extracted by the mobile device 110. Additionally or alternatively, one or more location identifiers may be included in the tones and the location identifiers may be extracted by the mobile device 110 and utilized to request additional information associated with a tone from an information source, such as information source 160 discussed in greater detail below.

The mobile device 110 may be a processor driven device that facilitates the receipt of transaction information from a POS device 105 and the processing of the received transaction information to request approval of a proposed transaction. For example, the mobile device 110 may include any number of special purpose computers or other particular machines, application specific circuits, microcontrollers, and the like. In certain embodiments, at least a portion of the operations of the mobile device 110 may be controlled by computer-executed or computer-implemented instructions that are executed by one or more processors associated with the mobile device 110. The instructions may be embodied in one or more software components as desired in various embodiments of the invention. The execution of the instructions may form a special purpose computer or other particular machine that is operable to receive and process transaction data. Additionally, in certain embodiments of the invention, the operations and/or control of the mobile device 110 may be distributed amongst several processing components.

The mobile device 110 may include one or more processors 141, one or more memory devices 142, one or more input/output ("I/O") device(s) 143 or I/O interfaces(s), and one or more network interface(s) 144. The one or more memory devices 142 may be any suitable memory devices, for example, caches, read only memory devices, random access memory devices, magnetic storage devices, etc. The one or more memory devices 142 may store data 145, executable instructions, and/or various program modules utilized by the mobile device 110, for example, stored transaction data, stored tone data 125, or promotional data that is received by the mobile device 110, an operating system 146, a transaction processing application 147, a tone processing application 148, and/or a user profile 149. The stored data 145 may include any suitable transaction data, and data extracted from one or more tones that are received by the mobile device 110, and/or any additional data associated with tones that is received from an information source 160. Examples of stored tone data may include one or more location identifiers that are extracted from received tones and/or other information extracted from received tones.

In certain embodiments of the invention, the mobile device 110 may include one or more software modules, such as an operating system 146, a transaction processing application 147, and/or a tone processing application 148. The operating system 146 may control the general operation of the mobile device 110, for example, the completion of telephone calls, the maintenance of an address book, the accessing of the Internet via a mobile browser application, etc. The operating system 146 may also facilitate the execution of other software modules by the one or more processors 141, for example, the transaction processing application 147 and/or the tone processing application 148. The transaction processing application 147 may facilitate and/or control the receipt of transaction information from a POS device 105 and the processing of the transaction information to complete a proposed transaction. For example, the transaction processing application 147 may facilitate and/or control the receipt of transaction information, the storage of transaction information, the generation of a request to approve a proposed transaction, the communication of an approval request to a transaction processor 115, the receipt of an accept or decline decision from the transaction processor 115, and/or the storage of information received from the transaction processor 115. In certain embodiments, the transaction processing application 147 may facilitate and/or control network communication between the mobile device 110 and one or more external devices, such as one or more transaction processors 115. Additionally, in certain embodiments, the transaction processing application 147 may facilitate the receipt of user input associated with a proposed transaction, such as the receipt of security information (e.g., a personal identification number (PIN), biometric security information, etc.), a selection of a payment account by a user of the mobile device 110, the input of various transaction amounts by a user of the mobile device 110 (e.g., a tip amount), the selection of coupons and/or rebate offers by a user of the mobile device 110, and/or the receipt of a transaction approval by a user of the mobile device 110. Although the transaction processing application 147 is illustrated as a single software component, the transaction processing application 147 may include any number of software components, modules, and/or applications as desired in various embodiments of the invention.

The tone processing application 148 may include computer-executable instructions that facilitate the receipt and processing of one or more tones by the mobile device 110. For example, the tone processing application 148 may facilitate and/or control the receipt of tones from one or more POS devices 105 or other tone transmission devices, the processing of received tones to extract information from the tones, including transaction information and/or location identifiers associated with the tones, the communication of requests for additional information associated with a tone from one or more information sources 160, the receipt of additional information from one or more information sources 160, the processing of received additional information, the storage of received additional information, and/or the subsequent access and/or processing of stored additional information. In certain embodiments of the invention, the tone processing application 148 may also facilitate and/or control network communication between the mobile device 110 and one or more external devices, such as one or more information sources 160. Although the tone processing application 148 is illustrated as a single software component, the tone processing application 148 may include any number of software components, modules, and/or applications as desired in various embodiments of the invention.

The user profile 149 may include one or more preferences and/or other information associated with one or more users of the mobile device 110. In certain embodiments, the user profile may include user preferences associated with desired payment accounts to utilize for a transaction, prestored security information associated with one or more payment accounts and/or the transaction processing application, and/or various identification information associated with a user of the mobile device 110. A wide variety of identification information associated with a user may be utilized in various embodiments of the invention, for example, a mailing address or shipping address for the user and/or demographic information associated with a user. In the event that a proposed transaction is requested by a user of the mobile device 110 for goods that should be shipped to the user, the mailing address may be communicated to a POS device 105, a merchant, and/or a transaction processor 115 to facilitate the shipment. Alternatively, the mailing address may be stored by the transaction processor 115.

In certain embodiments, the user profile 149 may include one or more user preferences associated with types of desired tones and/or additional information that may be received and processed by the mobile device 110. For example, the user profile 149 may include preferences indicating that certain tones and/or additional information should be or should not be received and/or processed by the mobile device 110. In this regard, tones and/or additional information may be filtered by the mobile device 110. A wide variety of different preferences and/or criteria may be utilized as desired in various embodiments, including but not limited to, merchant criteria, merchant class or merchant type criteria, broadcaster criteria, marketing source criteria, etc. As another example, the user profile 149 may include one or more preference associated with the manner in which tones and/or additional information should be processed by the mobile device 110.

The one or more I/O devices 143 may facilitate communication between the mobile device 110 and one or more input/output devices, for example, one or more user interface devices, such as a display, keypad, control panel, touch screen display, remote control, microphone, etc. that facilitate user interaction with the mobile device 110. In this regard, one or more user preferences associated with the operation of the mobile device 110 may be received and processed.

The one or more network interfaces 144 may facilitate connection of the mobile device 110 to one or more suitable networks 140, 141, for example, a cellular network, a local area network, a wide area network, the Internet, a Bluetooth enabled network, a Wi-Fi network, a radio frequency network, any wired network, any wireless network, etc. In this regard, the mobile device 110 may receive transaction information from a POS device 105 via a network 140 and/or may communicate with a transaction processor 115. For example, transaction information may be received from a POS device 105 via a Bluetooth network, radio frequency (RF) network, local area network, etc. As another example, the mobile device 110 may communicate a request to approve a proposed transaction to a transaction processor 115 via a cellular network or mobile Internet browser.

In embodiments of the invention that utilize tones, the one or more network interfaces 144 may facilitate the request and receive additional information or data associated with tones from one or more external devices, network components, and/or systems, such as an information source 160. For example, the mobile device 110 may receive a tone from a POS device 105 or other tone transmission device and extract one or more location identifiers from the received tone. The mobile device 110 may utilize the one or more extracted location identifiers to access one or more information sources 160 via a cellular network or mobile Internet browser and receive additional information associated with the tone. The mobile device 110 may utilize a wide variety of different techniques, methods, and/or systems to communicate with the one or more information sources 160. For example, a mobile Internet browser or other specific purpose or dedicated application may facilitate communication between the mobile device 110 and the one or more information sources 160. As another example, short message service (SMS) communications may be utilized to facilitate communication between the mobile device 110 and the one or more information sources 160.

According to an aspect of the invention, the mobile device 110 may receive one or more tones associated with transaction information from a POS device 105 or other tone transmission device. A tone may be output by a POS device 105 and the mobile device 110 may identify and receive the output tone within a predetermined distance or range "d" from the POS device 105. A POS device 105 may have a wide variety of different ranges as desired in various embodiments of the invention, for example, a range of approximately three feet. In certain embodiments of the invention, the tone processing application 148 of the mobile device 110 may control the receipt of tones by the mobile device 110. For example, a setting or option associated with the tone processing application 148 may control the receipt of tones by the mobile device 110. When a user indicates that the setting or option should be set to allow tones to be received, the receipt of tones may be facilitated by the mobile device 110. However, when a user indicates that the setting or option should be set to disallow the receipt of tones, then the mobile device 110 will not process any tones output by a POS device 105. In some embodiments, tones may be received and processed when a user of the mobile device 110 opens, executes, or leaves on the tone processing application 148. In other embodiments, tones may be received and processed only when a user selects an option within the tone processing application 148 indicating that tones should be received. Additionally, in certain embodiments, the tone processing application 148 may facilitate the communication of a request for one or more tones to a POS device 105 or other tone transmission device.

The mobile device 110 may include one or more input devices that facilitate the receipt of tones. For example, a microphone 150 associated with the mobile device 110 may be utilized to receive tones that have been output by one or more speakers associated with a POS device 105. After being received by the microphone 150, a tone may be passed through one or more filters 151, for example, one or more band pass filters that facilitate the isolation of the tone from other transmissions received by the microphone 150. The filtered tone may then be passed through one or more analog-to-digital converters 152 prior to being communicated to the one or more processors 141. In this regard, an analog tone may be transformed into digital information that may be processed by the tone processing application 148. The tone processing application 148 may process the digital information associated with the tone, and the tone processing application 148 may extract information from the tone, such as transaction information and/or location identifiers. In certain embodiments of the invention, the tone processing application 148 may further filter the received digital information with one or more digital filters or software filters.

If one or more location identifiers are extracted by the tone processing application 148, the tone processing application 148 may utilize the location identifiers to request and/or receive additional information associated with the tone, for example, special offer information and/or transaction information. The location identifiers may facilitate the identification of one or more information sources 160 from which the additional information associated with the tone may be received. The tone processing application 148 may direct the communication of a request for the additional information to at least one information source 160 via a suitable network 141. The request may include at least one location identifier and/or an identifier of the mobile device 110, for example, a telephone number associated with the mobile device 110, a universal integrated circuit card (UICC) identifier, a universal device identifier (UDID), a subscriber identity module (SIM) card identifier, or an international mobile subscriber identity (IMSI) number associated with the mobile device 110. Responsive to the request, the mobile device 110 may receive the requested additional information associated with the tone via the network 141. The tone processing application 148 may process at least a portion of the received additional information. Additionally, the tone processing application 148 may direct the storage of the location identifiers and/or the received additional information in the memory 142 of the mobile device 110. As desired, at least a portion of the received additional information may be presented or output to a user of the mobile device 110 via one or more suitable output devices associated with the mobile device 110, for example, a display, speaker, headset, or an output device external to the mobile device 110.

Additional information associated with a tone may be utilized by a mobile device 110 for a wide variety of different purposes as desired in various embodiments of the invention. For example, additional information may include advertisement, marketing, special offer, product offer, proposed transaction, or other information about a product or service, and at least a portion of the additional information may be formatted for and displayed to a user of the mobile device 110 via a suitable output device associated with the mobile device 110 (e.g., an LCD display). As another example, additional information may facilitate the display of selection or rating information on an output device associated with the mobile device 110. User input associated with rating products or services may be received and processed. In some embodiments, the additional information may facilitate the display of information that allows a user of the mobile device to order, purchase, or reserve the product or service. In other embodiments, the additional information may be stored by the mobile device 110 and utilized in a subsequent purchase of a product or service. For example, the additional information may include a coupon for a product, and the coupon may be accessed from memory by the mobile device 110 at a POS device 105. The coupon may be displayed on a display of the mobile device, scanned from the display at the POS device 105, communicated from the mobile device 110 to the POS device 105 via a suitable network connection, or communicated to an intermediary device that interacts with the point of sale terminal, such as a contactless transaction device associated with the mobile device 110.

Embodiments of the invention may include mobile devices 110 with more or less than the components illustrated for the mobile device 110 illustrated in FIG. 1. The description of the mobile device 110 of FIG. 1 is provided by way of example only and is not intended to be limiting.

With continued reference to FIG. 1, the system 100 may include any number of transaction processors 115 that are operable to receive and process requests to approve proposed transactions. During the processing of a proposed transaction, a transaction processor 115 may access account information associated with a payment account to be utilized for the transaction, and the transaction processor 115 may make a determination as to whether the proposed transaction should be approved or declined. In making this determination, a wide variety of different risk analyses may be conducted by the transaction processor 115 and/or other systems in communication with the transaction processor as desired in various embodiments of the invention. Once an approval or decline decision has been made by the transaction processor 115, an indication of the approval or decline decision may be communicated to the POS device 105 and/or to a merchant associated with the POS device 105 or a tone transmission device to complete the transaction. The transaction processor 115 may then facilitate settlement of the transaction by directing payment of funds to the merchant.

A transaction processor 115 may be a processor driven device or network entity that facilitates the receipt of a request to approve a transaction, the processing of the request, and/or the communication of an approval or decline decision to a POS device 105 or merchant. The transaction processor 115 may include any number of processors and/or processing components as desired in various embodiments of the invention. For example, the transaction processor 115 may include any number of special purpose computers or other particular machines, application specific circuits, microcontrollers, personal computers, servers, and the like. In certain embodiments, at least a portion of the operations of the transaction processor 115 may be controlled by computer-executed or computer-implemented instructions that are executed by one or more processors associated with the transaction processor 115. The instructions may be embodied in one or more software components as desired in various embodiments of the invention. The execution of the instructions may form a special purpose computer or other particular machine that is operable to receive and process requests for approving a proposed transaction. Additionally, in certain embodiments of the invention, the operations and/or control of the transaction processor 115 may be distributed amongst several processing components.

The transaction processor 115 may include one or more processors 171, one or more memory devices 172, one or more input/output ("I/O") device(s) 173 or I/O interface(s), and one or more network interface(s) 174. The one or more memory devices 172 may be any suitable memory devices, for example, caches, read only memory devices, random access memory devices, magnetic storage devices, databases, etc. The one or more memory devices 172 may store data, executable instructions, and/or various program modules utilized by the transaction processor 115, for example, payment account data 175 associated with a user of the mobile device 110, an operating system 176, a host module 177, a transaction processing application 178, and/or a settlement module 179.

In certain embodiments of the invention, the transaction processor 115 may include one or more software modules, such as an operating system 176, a host module 177, a transaction processing application 178, and/or a settlement module 179. The operating system 176 may control the general operation of the transaction processor 115 and may facilitate the execution of other software modules by the one or more processors 171. The host module 177 may include computer-executable instructions that facilitate the receipt and processing of one or more requests to approve a proposed transaction. For example, the host module 177 may facilitate and/or control the establishment of a network session with a mobile device 110, the receipt, from the mobile devices 110, of a request to approve a proposed transaction, the communication of an approval or decline decision to the mobile device 110, the establishment of a network session with a POS device 105 or a merchant, and/or the communication of an approval or decline decision to the POS device 105 or merchant. As desired, the host module 177 may facilitate and/or control network communication between the transaction processor 115 and one or more external devices, such as a mobile device 110 and/or the POS device 105. Although the host module 177 is illustrated as a single software component, the host module 177 may include any number of software components, modules, and/or applications as desired in various embodiments of the invention.

The transaction processing application 178 may include computer-executable instructions that facilitate the processing of a received request to approve a proposed transaction in order to determine whether the proposed transaction will be approved or declined. A wide variety of different operations may be performed by the transaction processing application 178 as desired in various embodiments of the invention. For example, the transaction processing application 178 may identify a payment account to utilize for a proposed transaction, may access information associated with the payment account, may conduct one or more risk assessment determination or evaluations for the proposed transaction based on transaction information and/or information associated with the payment account, and/or may determine whether to approve or decline the transaction based at least in part on the various risk assessments. Although the transaction processing application 178 is illustrated as a single software component, the transaction processing application 178 may include any number of software components, modules, and/or applications as desired in various embodiments of the invention.

The settlement module 179 may include computer-executable instructions that facilitate the settlement of a transaction that has been approved. A wide variety of different operations may be performed by the settlement module 179 as desired in various embodiments of the invention. For example, the settlement module 179 may direct the payment or disbursement of a transaction amount to a merchant account or other account associated with the POS device 105, may direct the debiting of a payment account associated with a user of the mobile device 110, may direct the adjustment of a credit amount associated with a user of the mobile device 110, may direct the adjustment of a stored value, etc. In certain embodiments, the settlement module 179 and/or the host module 177 may facilitate communication with one or more other entities, systems, and/or network components via any number of suitable networks to complete settlement of a transaction. For example, the settlement module 179 may facilitate communication with one or more financial institutions, credit card processors, automated clearing houses, stored value card processors, and the like in order to facilitate settlement of the transaction. Additionally, as desired in various embodiments, communication may be established by the transaction processing application 178 with any of these other entities, systems, and/or network components to facilitate the determination of whether a proposed transaction should be approved or declined. Although the settlement module 179 is illustrated as a single software component, the settlement module 179 may include any number of software components, modules, and/or applications as desired in various embodiments of the invention.

The one or more I/O devices 173 may facilitate communication between the transaction processor 115 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the transaction processor 115 may be received, and information processed by the transaction processor 115 may be output.

The one or more network interfaces 174 may facilitate connection of the transaction processor 115 to one or more suitable networks 141, for example, a cellular network, a local area network, a wide area network, the Internet, a Bluetooth enabled network, a Wi-Fi network, a radio frequency network, any wired network, any wireless network, etc. In this regard, the transaction processor 115 may receive requests for approving a proposed transaction from a mobile device 110 and may communicate an acceptance or decline decision to a POS device 105 or merchant. The transaction processor 115 may utilize a wide variety of different techniques, methods, and/or systems to communicate with a mobile device 110, a POS device 105, a merchant, and/or other network components. For example, a web server or other specific purpose or dedicated application may facilitate communication between the transaction processor 115 and another component of the system 100. As another example, short message service (SMS) communications may be utilized to facilitate communication between the transaction processor 115 and another component of the system 100, such as the mobile device 110.

Embodiments of the invention may include transaction processor 115 with more or less than the components illustrated for the transaction processor 115 illustrated in FIG. 1. The description of the transaction processor 115 of FIG. 1 is provided by way of example only and is not intended to be limiting.

With continued reference to FIG. 1, in embodiments of the invention that utilize tones, the system 100 may include any number of information sources 160 that are operable to provide additional information associated with tones to a mobile device 110. The additional information may be communicated to a mobile device 110 by an information source 160 in response to a request for the additional information. In certain embodiments of the invention, a mobile device 110 may communicate requests directly to any number of information sources 160. In other embodiments, the mobile device 110 may communicate requests to a single information source or a central information source. The central information source may communicate with other information sources as desired in various embodiments of the invention and collect additional information that is communicated to the mobile device 110. Additionally or alternatively, the central information source may establish direct communication between the mobile device 110 and another information source, for example, via handing off a network session between the mobile device 110 and the central information source to another information source.

An information source 160 may be a processor driven device or network entity that facilitates the receipt of a request for additional information or data associated with a tone, the accessing of the additional information, and the communication of the additional information to another component of the system 100 in response to the received request for the additional information. For example, the additional information may be communicated to the mobile device 110 or to another information source 160 in response to a request for the additional information. The information source 160 may include any number of processors and/or processing components as desired in various embodiments of the invention. For example, the information source 160 may include any number of special purpose computers or other particular machines, application specific circuits, microcontrollers, personal computers, servers, and the like. In certain embodiments, at least a portion of the operations of the information source 160 may be controlled by computer-executed or computer-implemented instructions that are executed by one or more processors associated with the information source 160. The instructions may be embodied in one or more software components as desired in various embodiments of the invention. The execution of the instructions may form a special purpose computer or other particular machine that is operable to receive and process requests for additional information associated with tones. Additionally, in certain embodiments of the invention, the operations and/or control of the information source 160 may be distributed amongst several processing components.

The information source 160 may include one or more processors 161, one or more memory devices 162, one or more input/output ("I/O") device(s) 163 or I/O interface(s), and one or more network interface(s) 164. The one or more memory devices 162 may be any suitable memory devices, for example, caches, read only memory devices, random access memory devices, magnetic storage devices, databases, etc. The one or more memory devices 162 may store data, executable instructions, and/or various program modules utilized by the information source 160, for example, data associated with tones, for example, associated information 165 associated with tones, an operating system 166, and/or a host module 167. The stored associated data 165 may include any information associated with a tone that may be received by a mobile device 110. For example, the stored associated data 165 may include marketing information associated with a tone, special offers associated with a tone, coupons, rebates, etc.

In certain embodiments of the invention, the information source 160 may include one or more software modules, such as an operating system 166 and/or a host module 167. The operating system 166 may control the general operation of the information source 160 and may facilitate the execution of other software modules by the one or more processors 161, for example, the execution of the host module 167. The host module 167 may include computer-executable instructions that facilitate the receipt and processing of one or more requests for additional information associated with tones. For example, the host module 167 may facilitate and/or control the receipt, from one or more mobile devices 110 and/or other information sources, of requests for additional information associated with tones, the processing of the received requests to access the additional information, and the communication of the additional information to the requesting entity. Additionally, the host module 167 may facilitate and/or control network communication between the information source 160 and one or more external devices, such as a mobile device 110 and/or other information sources. Although the host module 167 is illustrated as a single software component, the host module 167 may include any number of software components, modules, and/or applications as desired in various embodiments of the invention.

In certain embodiments, a request for additional information associated with a tone may include one or more location identifiers that have been extracted from the tone by the mobile device 110. Additionally, the request may include an identifier of the mobile device 110. The host module 167 may receive the request and process the request to extract the one or more location identifiers and/or the identifier of the mobile device 110. In other words, the received request may be transformed by the host module 167 into data that is representative of the one or more location identifiers and/or the identifier of the mobile device 110. The one or more location identifiers may be utilized to access additional information associated with a tone. For example, a location identifier may be utilized to search for additional information associated with a tone that is stored in a memory 162 of the information source 160. In certain embodiments, a location identifier may function as a pointer to stored additional information. As another example, a location identifier may be utilized in the generation of a request for additional information that is communicated to another information source. One or more location identifiers may reference other information sources and/or memory locations associated with the other information sources. The host module 167 may generate a request for additional information and communicate the request to the other information sources. The request may be processed by a host module of the other information sources and the requested additional information may be communicated to the requesting host module 167. Once the additional information has been obtained by the host module 167, at least a portion of the additional information may be communicated by the host module 167 to the mobile device 110 via one or more suitable networks 141.

The one or more I/O devices 163 may facilitate communication between the information source 160 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the information source 160 may be received and information processed by the information source 160 may be output.

The one or more network interfaces 164 may facilitate connection of the information source 160 to one or more suitable networks 141, for example, a cellular network, a local area network, a wide area network, the Internet, a Bluetooth enabled network, a Wi-Fi network, a radio frequency network, any wired network, any wireless network, etc. In this regard, the information source 160 may receive requests for additional information and may communicate additional information associated with tones to a requesting mobile device 110. Additionally, the information source 160 may communicate with other information sources as desired. The information source 160 may utilize a wide variety of different techniques, methods, and/or systems to communicate with a mobile device 110 and/or with other information sources. For example, a web server or other specific purpose or dedicated application may facilitate communication between the information source 160 and the mobile device 110. As another example, short message service (SMS) communications may be utilized to facilitate communication between the information source 160 and the mobile device 110.

Embodiments of the invention may include information sources 160 with more or less than the components illustrated for the information source 160 illustrated in FIG. 1. The description of the information source 160 of FIG. 1 is provided by way of example only and is not intended to be limiting.

With continued reference to FIG. 1, in embodiments of the invention that utilize tones, the system 100 may include any number of data sources 120 that are operable to communicate or otherwise provide tone data to the POS device 105 or other tone transmission device. In certain embodiments of the invention, a data source 120 may communicate tone data to the POS device 105 via one or more suitable networks 135. Tone data may be communicated to a POS device 105 in response to the receipt, from the POS device 105, of a request for the tone data. Alternatively, a data source 120 may push or otherwise communicate tone data to the POS device 105 without the tone data being requested.

A data source 120 may be a processor driven device or network entity that facilitates the communication of tone data to another component of the system 100, for example, a POS device 105. The data source 120 may include any number of processors and/or processing components as desired in various embodiments of the invention. For example, the data source 120 may include any number of special purpose computers or other particular machines, application specific circuits, microcontrollers, personal computers, servers, and the like. In certain embodiments, at least a portion of the operations of the data source 120 may be controlled by computer-executed or computer-implemented instructions that are executed by one or more processors associated with the data source 120. The instructions may be embodied in one or more software components as desired in various embodiments of the invention. The execution of the instructions may form a special purpose computer or other particular machine that is operable to communicate tone data. Additionally, in certain embodiments of the invention, the operations and/or control of the data source 120 may be distributed amongst several processing components.

The data source 120 may include one or more processors 181, one or more memory devices 182, one or more input/output ("I/O") device(s) 183 or I/O interface(s), and one or more network interface(s) 184. The one or more memory devices 182 may be any suitable memory devices, for example, caches, read only memory devices, random access memory devices, magnetic storage devices, databases, etc. The one or more memory devices 182 may store data, executable instructions, and/or various program modules utilized by the data source 120, for example, tone data 185 associated with tones, an operating system 186, and/or a host module 187. The stored tone data 185 may include stored data associated with a tone that is communicated to a POS device 105 for output by the POS device 105. For example, the stored tone data 185 may include stored digital data associated with a tone, such as a WAV file, MP3 file. MPEG file, AIFF file, AAC file, Apple Lossless file, or other digital media file format.

In certain embodiments of the invention, the data source 120 may include one or more software modules, such as an operating system 186 and/or a host module 187. The operating system 186 may control the general operation of the data source 120 and may facilitate the execution of other software modules by the one or more processors 181, for example, the execution of the host module 187. The host module 187 may include computer-executable instructions that facilitate the communication of tone data 185 to a POS device 105. For example, the host module 187 may facilitate and/or control the receipt, from a POS device 105, of a request for tone data 185, the processing of the received requests to access the tone data 185, and/or the communication of tone data 185 to the POS device 105. As another example, the host module 187 may facilitate the establishment of a network session or other communication with the POS device 105, and the host module 187 may direct the communication or transmission of tone data 185 to the POS device 105. The host module 187 may also facilitate and/or control network communication between the data source 120 and one or more other data sources. Although the host module 187 is illustrated as a single software component, the host module 187 may include any number of software components, modules, and/or applications as desired in various embodiments of the invention.

The one or more I/O devices 183 may facilitate communication between the data source 120 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the data source 120 may be received and information processed by the data source 120 may be output.

The one or more network interfaces 184 may facilitate connection of the data source 120 to one or more suitable networks 135, for example, a local area network, a wide area network, the Internet, a cellular network, a Bluetooth enabled network, a Wi-Fi network, a radio frequency network, any wired network, any Wireless network, etc. In this regard, the data source 120 may communicate tone data 185 to a POS device 105. Additionally, the data source 120 may communicate with other data sources as desired in various embodiments of the invention. For example, a first data source 120 may receive tone data 185 from a second data source 120, and the first data source 120 may communicate the received tone data 185 to the POS device 105.

Embodiments of the invention may include data sources 120 with more or less than the components illustrated for the data source 120 illustrated in FIG. 1. The description of the data source 120 of FIG. 1 is provided by way of example only and is not intended to be limiting.

Although FIG. 1 has been described as having specific functions performed by specific components of the system 100, various functions and/or operations of embodiments of the invention may be performed by any suitable component of the system 100. Additionally, various operations may be completed in a distributed manner by multiple components of the system 100.

Additionally, certain components of the system 100 are described as having any number of processors or processing components. Operations may be completed by the one or more processors as desired in various embodiments of the invention. A different processor may be provided to complete or facilitate each operation of a system component, or alternatively, multiple operations may be completed or facilitated by a single processor. For example, a first processor of the mobile device 110 may facilitate the receipt of transaction information; a second processor may facilitate the generation of a request to approve a proposed transaction; and a third processor may facilitate the communication of a request to approve a proposed transaction to the transaction processor 115. As desired, two or more of the first, second, and third processors may be the same processor. Although the example above relates to the operations of the mobile device 110, the operations of other components of the system 100 may be completed and/or facilitated in a similar manner.

FIG. 2 is a diagram of one example data flow 200 of transmitting transaction information to a mobile device and requesting approval of the transaction by the mobile device, according to an illustrative embodiment of the invention. The data flow 200 may be applicable to a wide variety of systems utilized to communicate transaction information to a mobile device, including but not limited to, the system 100 illustrated in FIG. 1.

With reference to FIG. 2, a POS device 205 may communicate transaction information 210 to a mobile device 215. The transaction information 210 may include a wide variety of different information as desired, for example, an amount associated with a proposed transaction, individual amounts associated with various goods and/or services, a tax amount, a service charge amount, a tip amount, a merchant location, a merchant identifier, a POS identifier, etc. In certain embodiments, a communications session may be established between the POS device 205 and the mobile device 215 via one or more suitable networks, such as a radio frequency network, a cellular network, a Bluetooth network, a Wi-Fi network, etc., and the transaction information 210 may be communicated to the mobile device 215 via the communications session. The communications session may be initiated by the POS device 205 or by the mobile device 215 in various embodiments of the invention.

Additionally or alternatively, in certain embodiments of the invention, at least a portion of the transaction information 210 may be communicated to the mobile device 215 via one or more tones that are output by the POS device 205 and received by the mobile device 215. For example, tones may be output by one or more speakers associated with the POS device 205, and the tones may be received by a microphone associated with the mobile device 215. The mobile device 215 may process the tones to extract information included in the tones. The included information may include transaction information 210 and/or location identifiers that may be utilized by the mobile device 215 to obtain transaction information 210 from one or more information sources, such as the information sources 160 described above with reference to FIG. 1.

In addition to the POS device 205 communicating transaction information 210 to the mobile device 215, the mobile device 215 may communicate information 220 to the POS device 205. A wide variety of different information 220 may be communicated to the POS device 205 by the mobile device 215 as desired in various embodiments of the invention. For example, a request to initiate a transaction may be communicated from the mobile device 215 to the POS device 205. As another example, information associated with coupons, special offers, rebates, rewards, gift cards, etc., may be communicated to the POS device 205. This information may be processed by the POS device 205, and the transaction information 210 may be modified based on the processing that is completed. In this regard, discounts and rewards may be applied at the POS device 205. This information may be communicated to the POS device 205 either before or after transaction information 210 is communicated to the mobile device 215. As yet another example, an indication that transaction information has been received by the mobile device 215 may be communicated to the POS device 205.

The communication of the information 220 to the POS device 205 by the mobile device 215 may be facilitated through network communications and/or via the outputting of tones by the mobile device 215 that are received by the POS device 205. For network communications, any number of suitable networks may be utilized as desired in various embodiments of the invention, such as a radio frequency network, a cellular network, a Bluetooth network, a Wi-Fi network, etc. For the communication of information by tones, a tone may be output by the mobile device 215, for example, by a speaker associated with the mobile device 215, and the tone may be received by an input device (e.g., microphone) of the POS device 205 and processed to extract included information. In certain embodiments, the extracted information may include location identifiers that may be utilized by the POS device 205 to obtain additional information associated with a tone from an information source 160.

In embodiments of the invention where tones are output by the POS device 205, information associated with the tones may be received by the POS device 205 from one or more tone data sources 225. For example, a request 230 for tone information may be communicated to a tone data source 225 by a POS device 205 and tone information 235 may be communicated to the POS device 205 in response to the request. As another example, tone information 235 may be pushed to the POS device 205 by the tone data source 225 without the tone information 235 being requested. A wide variety of tone information 235 may be communicated to the POS device 205 including, but not limited to, digital information that is representative of a tone, information that may be utilized to generate a tone, etc. Additionally, communication between the POS device 205 and a tone data source 225 may be facilitated via one or more suitable networks, for example, a local area network, wide area network, the Internet, cellular network, radio frequency network, a Bluetooth enabled network, a Wi-Fi network, etc.

Once the transaction information 210 has been received by the mobile device 215, the transaction information 210 may be processed by the mobile device 215 and utilized in the generation of a request 240 to approve a proposed transaction. A portion or all of the transaction information 210 may be included in the generated request 240. Additionally, the generated request 240 may include an identifier of a payment account to utilize for the transaction, user identifying information, an identifier associated with the mobile device 215, and/or special offer, rebate, reward, coupon information, etc. The generated request 240 may be communicated to a transaction processor 245 by the mobile device 215 via one or more suitable networks, for example, a cellular network, wide area network, etc. In certain embodiments, the generated request 240 may be communicated to a transaction processor 245 associated with a payment account utilized for the transaction, for example, a credit card processor or a debit card processor. In other embodiments, the generated request 240 may be communicated to a central transaction processor 245 that may be in communication with one or more other third party transaction/settlement processors 265. For purposes of describing the remainder of the flow diagram 200, it will be assumed that the generated request 240 is communicated to a central transaction processor 245.

In certain embodiments of the invention, transaction information 242 may also be communicated to the transaction processor 245 from the POS device 205. In certain embodiments, the transaction information 242 communicated from the POS device 205 may be similar to the transaction information 240 communicated to the transaction processor 245 from the mobile device 215. The transaction information 242 may be communicated to a transaction processor 245 by the POS device 205 via one or more suitable networks, for example, a cellular network, wide area network, the Internet, etc. As desired, the transaction processor 245 may utilize the transaction information received from the POS device 205 to verify and/or validate the proposed transaction. For example, the transaction processor 245 may compare certain transaction information 240 received from a mobile device 215 to corresponding transaction information 242 received from a POS device 205, such as a transaction identifier received from each device, to verify the proposed transaction or to validate the request to approve the proposed transaction.

Once the transaction processor 245 receives the request 240 to approve a proposed transaction, the transaction processor 245 may process the request 240 in order to determine whether the proposed transaction should be approved or declined. A wide variety of different operations may be conducted by the transaction processor 245 in making the determination. For example, the transaction processor 245 may identify an account to be utilized for the proposed transaction and a transaction amount associated with the proposed transaction. The identification of an account may be based on an indication received in the request 240 and/or on prestored preferences associated with the user of the mobile device 215. The transaction processor 245 may access information 260 associated with the identified payment account from one or more memory devices, and the transaction processor 245 may utilize the accessed information 260 and/or the transaction amount to conduct a wide variety of different risk determinations associated with the proposed transaction. The transaction processor 245 may then determine whether to accept or decline the proposed transaction based at least in part on the conducted risk determination(s).

Once a determination has been made by the transaction processor 245 as to whether the transaction should be approved or declined, an indication 250 of approval or decline may be communicated by the transaction processor 245 to the POS device 205 or a merchant associated with the POS device 205. An identifier of the POS device 205 or merchant that is included in the request 240 may be utilized to identify the POS device 205 or merchant for communicating the indication 250. The indication 250 may be communicated to the POS device 205 or merchant via any number of suitable networks, for example, a wide area network, the Internet, a cellular network, etc. The transaction may be completed once the indication 250 has been received. In this regard, transactions may be facilitated without a POS device 205 or merchant obtaining account information from a consumer. Accordingly, safeguards may be provided for the account information.

In certain embodiments, the transaction processor 245 may communicate an indication 255 of whether the proposed transaction is approved or declined to the mobile device 215 that requested the approval of the transaction. The communication of the indication 255 may be facilitated via the one or more networks that are utilized by the mobile device 215 to communicate the request 240 for approval to the transaction processor 245. The indication 255 may be received by the mobile device 215 and, as desired, stored in a memory associated with the mobile device 215. In certain embodiments, the mobile device 215 may communicate the indication 255 to the POS device 205.

In certain embodiments, the transaction processor 245 may facilitate the settlement of an approved transaction. The settlement of a transaction may be conducted following the approval of the transaction or concurrently with the approval of the transaction. The settlement may include directing the disbursement of funds to a merchant account associated with a merchant that operates the POS device 205. The settlement may also include debiting funds from, adjusting a balance, or adjusting a credit line for a payment account utilized by the user of the mobile device 215 to complete the transaction.

In certain embodiments, the transaction processor 245 may communicate with one or more third party transaction processors and/or settlement processors 265 to facilitate the determination of whether to approve or decline a proposed transaction and/or to facilitate settlement of the transaction. For example, a request 270 to approve or decline a proposed transaction may be communicated from the transaction processor 245 to a third party transaction processor 265, such as a financial institution or a credit card processor. The request 270 may be processed by the third party transaction processor 265 and an indication 275 of whether the transaction should be approved or declined may be communicated from the third party transaction processor 265 to the transaction processor 245. Similarly, a request for settlement of a transaction may be communicated from the transaction processor 245 to a third party settlement processor 265, such as a financial institution or a credit card processor. The request may be processed by the third party settlement processor 265 and, as desired, an indication that the transaction has been settled may be communicated from the third party settlement processor 265 to the transaction processor 245.

Many variations may be made to the data flow 200 illustrated in FIG. 2 as desired in various embodiments of the invention. The data flow 200 is not intended to be limiting, but instead is provided by way of example only as an illustrative embodiment of the invention.

FIG. 3 is flow chart of one example method 300 of facilitating a payment transaction in accordance with an illustrative embodiment of the invention. The method 300 may include various operations that are performed by a POS device, a mobile device, and/or a transaction processor as desired in various embodiments of the invention. Additionally, the method 300 may include communicating transaction information to a mobile device that requests a transaction processor to approve the transaction.

The method 300 may begin at block 305. At block 305, which may be optional in various embodiments of the invention, communication may be established between a mobile device, such as the mobile device 110 shown in FIG. 1, and a POS device, such as the POS device 105 shown in FIG. 1. The communication may be established via one or more suitable networks, for example, a local area network, radio frequency network, Bluetooth network, Wi-Fi network, etc. An established communication session may facilitate the communication of information between the POS device 105 and the mobile device 110 and vice versa. For example, coupon and/or rewards information may be communicated from the mobile device 110 to the POS device 105. As another example, transaction information associated with an offer or proposed transaction may be communicated from the POS device 105 to the mobile device 110. As an alternative to or in addition to communicating via a network communications session, communications between the POS device 105 and the mobile device 110 may be facilitated through the use of outputting tones by one device that are received by the other device.

At block 310, transaction information communicated from the POS device 105 may be received at the mobile device 110. The transaction information may include a wide variety of information associated with an offer or a proposed transaction, for example, product or service information, individual amounts associated with various goods and/or services, a tax amount, a service charge amount, a tip amount, a merchant location, a merchant identifier, a POS identifier, etc. A wide variety of identifiers may be utilized as desired for a POS device and/or merchant, for example, universal resource locators, internet protocol addresses, and/or any other suitable network identifier. The transaction information may be communicated to the mobile device 110 via a communications session or via one or more tones that are output by the POS device 105. If tones are utilized, the tones may be communicated to the mobile device 110 by a POS device 105 or by any appropriate tone transmission device that facilitates the proposal of a transaction to a user of the mobile device 110, for example, another mobile device, a television, a radio, etc.

At block 315, the mobile device 110 may communicate a request to approve a proposed transaction to a transaction processor, such as the transaction processor 115 illustrated in FIG. 1. The request may be communicated to the transaction processor 115 via any number of suitable networks, for example, a wide area network, the Internet, a cellular network, etc. The request may include at least a portion of the transaction information, and in some embodiments, an indication of a payment account to utilize for the proposed transaction. Additionally, in some embodiments, the request may include an identifier associated with the mobile device 110, for example, a telephone number associated with the mobile device 110, a universal integrated circuit card (UICC) identifier, a universal device identifier (UDID), a subscriber identity module (SIM) card identifier, or an international mobile subscriber identity (IMSI) number associated with the mobile device 110. Following the receipt of the request by the transaction processor 115 at block 315, operations may continue at block 320.

At block 320, the transaction processor 115 may make a determination as to whether the proposed transaction will be approved or declined. A wide variety of different risk assessment techniques may be utilized as desired to make the determination. These risk assessments and/or risk determinations may be conducted by the transaction processor 115 and/or other systems in communication with the transaction processor 115. As one example, the transaction processor 115 may identify a payment account to utilize for the transaction and the transaction processor 115 may determine a risk associated with using the identified payment account to complete a transaction for an identified transaction amount. For example, the transaction processor 115 may determine whether funds are available to complete the transaction or whether an available credit line will cover the transaction. Following the determination at block 320 of whether to approve or decline the transaction, operations may continue at block 325.

At block 325, the transaction processor 115 may communicate an indication of whether the proposed transaction is approved or declined to the POS device 105 and/or to a merchant associated with the POS device 105. The indication may be communicated by the transaction processor 115 utilizing any number of suitable networks, for example, a wide area network, the Internet, a cellular network, or any other network capable of communicating data. The POS device 105 or the merchant may utilize the received indication to complete the proposed transaction or to abandon the proposed transaction. In certain embodiments of the invention, the transaction processor 115 may communicate additional information to the POS device 105 or merchant along with the indication. For example, a mailing or shipping address associated with a user of the mobile device 110 may be communicated to a merchant to facilitate the shipping of purchased goods to the user. Additionally, in certain embodiments, the transaction processor 115 may communicate an indication of whether the proposed transaction is approved or declined to the mobile device 110 via one or more suitable networks, for example, a cellular network, wide area network, the Internet, etc. Following the communication of the indication at block 325, operations may continue at block 330.

At block 330, the transaction processor 115 may facilitate settlement of the transaction if the transaction is approved. The settlement may include directing the disbursement of funds to a merchant account associated with a merchant that operates the POS device 105. The settlement may also include debiting funds, adjusting a balance, or adjusting a credit line for a payment account utilized by the user of the mobile device 10 to complete the transaction. The transaction processor 115 may communicate with a wide variety of other entities to facilitate settlement of the transaction including, but not limited to, financial institutions, credit card processors, gift card processors, etc.

The method 300 may end following block 330.

The operations described and shown in the method 300 of FIG. 3 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 3 may be performed.

FIG. 4 is a flow chart of one example method 400 of requesting a payment transaction utilizing a mobile device, according to an illustrative embodiment of the invention. The method 400 may include various operations that are performed by a mobile device as desired in various embodiments of the invention, such as the mobile device 110 illustrated in FIG. 1.

The method may begin at block 405. At block 405, which may be optional in various embodiments of the invention, communication may be established between the mobile device 110 and a POS device, such as the POS device 105 shown in FIG. 1. The communication may be established via one or more suitable networks, for example, a local area network, radio frequency network, Bluetooth network, Wi-Fi network, etc. An established communications session may facilitate the communication of information between the POS device 105 and the mobile device 110 and vice versa. For example, coupon and/or rewards information may be communicated from the mobile device 110 to the POS device 105. As another example, transaction information associated with an offer or proposed transaction may be communicated from the POS device 105 to the mobile device 110. As an alternative to or in addition to communicating via a network communications session, communications between the POS device 105 and the mobile device 110 may be facilitated through the use of outputting tones by one device that are received by the other device.

At block 410, which may be optional in various embodiments of the invention, the mobile device 110 may communicate special offer data, coupon data, rewards data, and the like to the POS device 105 via the established connection. The special offer data may be utilized by the POS device 105 during the processing of a proposed transaction. For example, a discount may be applied at the POS device 105.

At block 415, transaction information may be received by the mobile device 110 from a POS device 105 or from a tone transmission device. The transaction information may include a wide variety of information associated with an offer or a proposed transaction, for example, product or service information, individual amounts associated with various goods and/or services, a tax amount, a service charge amount, a tip amount, a merchant location, a merchant identifier, a POS identifier, etc. A wide variety of identifiers may be utilized as desired for a POS device and/or merchant, for example, universal resource locators, internet protocol addresses, and/or any other suitable network identifier. The transaction information may be communicated to the mobile device 110 via a communications session or via one or more tones that are output by the POS device 105 or a tone transmission device. Following the receipt of transaction information at block 415, operations may continue at block 420.

At block 420, which may be optional in various embodiments of the invention, a user indication to approve a proposed transaction may be received at the mobile device 110. For example, one or more suitable input devices associated with the mobile device 110, such as a keypad or touch screen display, may be utilized to receive a user indication to approve a proposed transaction. Additionally, as desired, information associated with the proposed transaction may be displayed or otherwise communicated to a user of the mobile device 110 via one or more suitable output devices, such as a display. In this regard, the user may be prompted to approve the proposed transaction.

At block 425, which may be optional in various embodiments of the invention, a user selection of a payment account to utilize for the proposed transaction may be received at the mobile device 110. The selection may be received via one or more suitable input devices. Examples of payment accounts that may be selected include, but are not limited to, stored value accounts, debit card accounts, credit card accounts, and the like. As an alternative to receiving a user selection of a payment account, a default payment account may be utilized by the mobile device 110 or a payment account may be selected by the mobile device 110 based on user preferences and/or other factors. For example, a certain payment account may be utilized at a certain merchant or in association with a certain transaction type, transaction amount, or range of transaction amounts.

At block 430, which may be optional in various embodiments of the invention, verification information may be received by the mobile device 110 from a user of the mobile device. The verification information may be utilized to verify that the user is authorized to complete a transaction utilizing the mobile device 110 and/or that the user is authorized to utilize a selected payment account. A wide variety of verification information may be received by the user device including, but not limited to, a personal identification number (PIN), a password, answers to security questions, a thumbprint, a voice sample, a retinal scan, other biometric data, etc. The received verification information may be compared to pre-stored verification data that is stored in a memory associated with the mobile device 110. Based on the comparison, a determination may be made at optional block 435 as to whether the user is verified to utilize the mobile device 110 to complete a transaction. If it is determined at block 435 that the user is not verified, then operations may continue at block 440 and the mobile device 110 may decline the transaction and display an appropriate message to the user. If, however, it is determined at block 435 that the user is verified to utilize the mobile device 110 to complete a proposed transaction, then operations may continue at block 445.

At block 445, the mobile device 110 may communicate a request to approve a proposed transaction to a transaction processor 115. A portion or all of the transaction information may be included in the request. Additionally, as desired, the request may include an identifier of a payment account to utilize for the transaction, user identifying information, an identifier associated with the mobile device 110, and/or special offer, rebate, reward, coupon information, etc. The request may be communicated to the transaction processor 115 by the mobile device 110 via one or more suitable networks, for example, a cellular network, wide area network, etc. In certain embodiments, the request may be communicated to a transaction processor 115 associated with a payment account utilized for the transaction, for example, a credit card processor or a debit card processor. In other embodiments, the request may be communicated to a central transaction processor 115 that may be in communication with one or more other transaction processors. By the mobile device 110 requesting approval of the transaction, safeguards may be provided for sensitive user information, such as information associated with a payment account. For example, payment account information may not be shared with a POS device 105 or a merchant, thereby providing additional security for the information. Sensitive account information, such as an account number, may be stored at the transaction processor 115 and accessed in a secure manner utilizing a payment account identifier included in the request and/or utilizing various user preferences. In certain embodiments of the invention, the identifier of the payment account does not include an account number or other sensitive information for the payment account. For example, a generic identifier, such as credit card account, debit card account, etc. may be utilized to identify a payment account.

Once a request to approve a proposed transaction is received by the transaction processor 115, the transaction processor 115 may determine whether to approve the proposed transaction, and the transaction processor 115 may communicate an approval or decline indication to the POS device 105 and/or to the mobile device 110. In block 450, which may be optional in various embodiments of the invention, an indication of whether the proposed transaction was approved or declined may be received by the mobile device 110 from the transaction processor 115. At block 455, which may be optional in various embodiments of the invention, the received indication may be stored in a suitable memory associated with the mobile device 110 and/or displayed to a user of the mobile device 110.

The method may end following block 455

The operations described and shown in the method 400 of FIG. 4 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 4 may be performed.

FIG. 5 is a flow chart of one example method 500 of facilitating a payment transaction at a point of sale device according to an illustrative embodiment of the invention. The method 500 may include various operations that are performed by a point of sale device as desired in various embodiments of the invention, such as the POS device 105 illustrated in FIG. 1.

The method may begin at block 505. At block 505, which may be optional in various embodiments of the invention, communication may be established between the POS device 105 and a mobile device, such as the mobile device 110 shown in FIG. 1. The communication may be established via one or more suitable networks, for example, a local area network, radio frequency network, Bluetooth network, Wi-Fi network, etc. An established communications session may facilitate the communication of information between the POS device 105 and the mobile device 110 and vice versa. For example, coupon and/or rewards information may be communicated from the mobile device 110 to the POS device 105. As another example, transaction information associated with an offer or proposed transaction may be communicated from the POS device 105 to the mobile device 110. As an alternative to or in addition to communicating via a network communications session, communications between the POS device 105 and the mobile device 110 may be facilitated through the use of outputting tones by one device that are received by the other device.

At block 510, which may be optional in various embodiments of the invention, special offer data, coupon data, rewards data, and the like, may be received by the POS device 105 from the mobile device 110. The data may be receive via an established communications session or via tones output by the mobile device 110. At block 515, which may be optional in various embodiments of the invention, the POS device 105 may process the received special offer and/or other data. During the processing of the received special offer and/or other data, discounts or rewards may be applied by the POS device 105 to a proposed transaction. In this regard, transaction information associated with the proposed transaction may be modified by POS device 105 utilizing the special offer and/or other data. Following the processing of the special offer data at block 515, operations may continue at block 520.

At block 520, the POS device 105 may communicate transaction information to a mobile device 110. The transaction information may include a wide variety of information associated with an offer or a proposed transaction, for example, product or service information, individual amounts associated with various goods and/or services, a tax amount, a service charge amount, a tip amount, a merchant location, a merchant identifier, a POS identifier, etc. The transaction information may be communicated to the mobile device 110 via a network session and/or via outputting tones by the POS device 105. Once the transaction information is received by the mobile device 110, the mobile device 110 may communicate a request to approve the proposed transaction to a transaction processor, such as the transaction processor 115 illustrated in FIG. 1. The transaction processor 115 may determine whether the proposed transaction should be approved or declined, and the transaction processor 115 may communicate an approval or decline indication to the POS device 105 or a merchant associated with the POS device 105.

At block 525, which may be optional in certain embodiments of the invention, the POS device 105 may communicate transaction information to the transaction processor 115. For example, the POS device 105 may communicate an identifier of the transaction, an identifier of the POS device 105 and/or an amount of the transaction to the transaction processor 115. As desired, the transaction processor 115 may utilize the transaction information received from the POS device 105 to verify and/or validate the proposed transaction. For example, the transaction processor 115 may compare certain transaction information received from a mobile device 110 to corresponding transaction information received from a POS device 105, such as a transaction identifier received from each device, to verify the proposed transaction and/or to validate the request to approve the proposed transaction.

At block 530, the POS device 105 or a merchant associated with the POS device 105 may receive the approval or decline indication from the transaction processor 115. If an approval indication is received, then the POS device 105 or the merchant may complete the transaction. Purchased goods and/or services may be supplied to a consumer or user of the mobile device 110. If a decline indication is received, then the POS device 105 or the merchant may abandon the transaction or request that the consumer complete the transaction utilizing a different form of payment or a different payment account.

The method 500 ma) end following block 530.

The operations described and shown in the method 500 of FIG. 5 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 5 may be performed.

FIG. 6 is a flow chart of one example method of assessing a proposed payment transaction at a transaction processor, according to an illustrative embodiment of the invention. The method 600 may include various operations that are performed by a transaction processor as desired in various embodiments of the invention, such as the transaction processor 115 illustrated in FIG. 1.

The method may begin at block 605. At block 605, a request to approve a proposed transaction may be received by the transaction processor 115. In certain embodiments, the request may be received from a mobile device, such as the mobile device 110 illustrated in FIG. 1. In certain embodiments, a parallel request to approve a proposed transaction and/or transaction information associated with the proposed transaction may also be received from a POS device, such as the POS device 105 illustrated in FIG. 1. The information received from both devices 105, 110 may be utilized by the transaction processor 115 to verify and/or validate a request to approve a proposed transaction. For purposes of describing the remainder of FIG. 6, it will be assumed that a request is only received from the mobile device 110. The request may be received by the transaction processor 115 from a mobile device 110 via any number of suitable networks, for example, a wide area network, the Internet, a cellular network, etc. The request may include transaction information associated with a proposed transaction, and in some embodiments, an indication of a payment account to utilize for the proposed transaction. Additionally, in some embodiments, the request may include an identifier associated with the mobile device 110, for example, a telephone number associated with the mobile device 110, a universal integrated circuit card (UICC) identifier, a universal device identifier (UDID), a subscriber identity module (SIM) card identifier, or an international mobile subscriber identity (IMSI) number associated with the mobile device 110. Following the receipt of the request by the transaction processor 115 at block 605, operations may continue at block 610.

At block 610, the transaction processor 115 may identify a payment account to utilize for the proposed transaction. The payment account may be identified by utilizing an indication that is included in the request and/or by utilizing one or more prestored preferences associated with the user of the mobile device 110. For example, a certain payment account may be utilized for a payment to a certain merchant or in association with a certain transaction type, transaction amount, or range of transaction amounts. Once a payment account has been identified, information associated with the payment account may be accessed by the transaction processor 115 in certain embodiments of the invention.

At block 615, the transaction processor 115 may determine a transaction amount associated with the proposed transaction. The transaction amount may be extracted from the information included in the request that was communicated to the transaction processor 115 by the mobile device 110. Following the determination of a transaction amount at block 615, operations may continue at block 620.

At block 620, which may be optional in various embodiments of the invention, the transaction processor 115 may conduct one or more risk analyses or risk determinations for the proposed transaction. A wide variety of different risk assessment techniques may be utilized by the transaction processor 115 as desired in various embodiments. For example, the transaction processor 115 may determine whether funds are available to complete the transaction or whether an available credit line will cover the transaction.

At block 625, which may be optional in various embodiments of the invention, the transaction processor 115 may communicate a request for a risk determination or transaction approval determination to one or more third party transaction processors, and the transaction processor 115 may receive risk assessment information and/or approval or decline determinations from the third party processors. A wide variety of third party processors may be utilized as desired in various embodiments of the invention, for example, gift card processors, debit card processors, financial institutions, credit card processors, and the like. Communication with a third party processor may be facilitated via one or more suitable networks, for example, a wide area network, the Internet, an automated clearing house network, a financial network, etc.

At block 630, a determination may be made as to whether the proposed transaction should be accepted or declined. If it is determined at block 630 that the proposed transaction should be approved, then operations may continue at block 635 and an approval message may be generated by the transaction processor 115. If, however, it is determined at block 630 that the proposed transaction should be declined, then operations may continue at block 640 and a decline message may be generated by the transaction processor 115. Following block 635 or block 640, operations may continue at block 645.

At block 645, the generated approval or decline message may be communicated by the transaction processor 115 to the POS device 105 or to a merchant associated with the POS device 105. In certain embodiments, the POS device 105 or the merchant may be identified utilizing one or more identifiers included in the received transaction information. The communication of the approval or decline message may be facilitated via any number of suitable networks, for example, a wide area network, the Internet, a cellular network, etc. The POS device 105 or the merchant may utilize the received message to complete a transaction or decline a transaction.

At block 650, which may be optional in various embodiments of the invention, a generated approval or decline message may be communicated by the transaction processor 115 to the mobile device 110. In certain embodiments, the mobile device 110 may be identified utilizing a mobile device identifier that is prestored by the transaction processor 115 or included in the request to approve the proposed transaction. The communication of the approval or decline message may be facilitated via any number of suitable networks, for example, a wide area network, the Internet, a cellular network, etc.

At block 655, the transaction processor 115 may facilitate the settlement of the proposed transaction if the proposed transaction is approved. The settlement process may result in the disbursement of funds to a merchant or a merchant account and the debiting or other adjustment of a payment account utilized by the user for the transaction.

The method may end following block 655.

The operations described and shown in the method 600 of FIG. 6 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 6 may be performed.

The communication of one or more in various embodiments of the invention may facilitate the communication of various type of information, such as product offer information, coupon information, and the like via tones. In various embodiments of the invention, a tone may include a wide variety of different information, for example, transaction information and/or one or more location identifiers that facilitate the requesting of additional information associated with a tone. FIG. 7 is a block diagram of data that may be included in an example tone 700, according to an illustrative embodiment of the invention.

With reference to FIG. 7, the tone 700 may include a header portion 705, a data portion 710, and/or a check sum portion 715. The header portion 705 may include, for example, information that identifies the tone 700 and the information and/or data that is included in the tone 700. The data portion 710 may include a data payload, for example, transaction information 720 and/or location identifiers 725, that may be extracted from the tone 700. Any number of location identifiers may be included in the data portion 710 as desired in various embodiments of the invention. Examples of location identifiers include content identifiers and/or information source identifiers. A content identifier may identify, reference, or point to a memory location or block of memory at which additional information associated with the tone 700 is stored at an information source. An information source identifier may identify, reference, or point to an information source at which additional information associated with the tone 700 is stored. The check sum portion 715 may include suitable information and/or data that may be utilized by a receiving device to verify that the tone 700 has been properly received.

The tone 700 described with reference to FIG. 7 illustrates one example of the information or data that may be included in a tone 700 that is utilized in various embodiments of the invention. A wide variety of other information and/or information formats may be utilized to form a tone as desired in various embodiments of the invention. The tone 700 of FIG. 7 is provided by way of example only and is not intended to be limiting.

Additionally, when a tone is output by one device for receipt by another device, the tone may be output as an analog signal. In certain embodiments of the invention, analog data for a tone may be received or accessed from memory by a tone transmitting device, and the analog data may be output for receipt by another device. In other embodiments of the invention, digital data for a tone may be received or accessed from memory by a tone transmitting device, and the digital data may be transformed into analog data and output for receipt by another device. A tone may be output utilizing a wide variety of signals as desired in various embodiments of the invention. For example, in certain embodiments, the information carried in a tone may be added to a base or carrier signal by modulating the base signal.

Accordingly, example embodiments of the invention can provide the technical effects of creating a system, method, and apparatus that facilitates the completion of a payment transaction. The payment transaction may be completed without providing sensitive information to a merchant, such as a payment account number and/or other payment account information. In this regard, example embodiments of the invention can provide the technical effects of facilitating relatively secure payment transactions.

The invention is described above with reference to FIGS. 1-7, which contain block and/or flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for requesting the completion of a payment transaction by a mobile device, the method comprising:
    receiving, from a point of sale device by a mobile device utilizing at least one microphone, within a predetermined distance from the point of sale device, one or more tones output by the point of sale device and comprising embedded information associated with a proposed transaction;
    extracting, by the mobile device, the received information from the one or more tones;
    transmitting, by the mobile device to a third-party processor, a first request for a risk analysis for the proposed transaction based at least in part on the extracted information;
    receiving, by the mobile device from the third-party processor, the risk analysis in response to the request;
    generating, by the mobile device utilizing at least a portion of the received information and an identifier associated with the mobile device, a second request comprising the risk analysis to approve the proposed transaction; and
    communicating, from the mobile device to a transaction processor, the generated second request,
    wherein the transaction processor determines based at least in part on the risk analysis whether to approve the proposed transaction and communicates an approval or decline message to the point of sale device, and
    wherein account information associated with a user of the mobile device is not provided to the point of sale device or a merchant associated with the point of sale device.

2. The method of claim 1, further comprising:
    receiving, at the mobile device from the transaction processor, an indication of whether the proposed transaction was approved or declined.

3. The method of claim 1, further comprising:
    receiving, at the mobile device from a user of the mobile device, verification information for the user; and
    determining, based at least in part on the received verification information, whether the user is authorized to complete the proposed transaction using the mobile device,
    wherein the second request to approve the proposed transaction is communicated to the transaction processor based at least in part on the determination.

4. The method of claim 1, wherein receiving one or more tones comprising embedded information associated with a proposed transaction comprises receiving one or more tones comprising a transaction amount for the proposed transaction and an identifier associated with the point of sale device.

5. The method of claim 1, wherein the identifier associated with a mobile device comprises one of a telephone number, a universal integrated circuit card (UICC) identifier, a universal device identifier (UDID), a subscriber identity module (SIM) card identifier, or an international mobile subscriber identity (IMSI) number.

6. The method of claim 1, further comprising:
    receiving, at the mobile device from a user of the mobile device, a selection of a payment account to utilize for the proposed transaction,
    wherein the second request to approve the proposed transaction further comprises an identifier of the selected payment account.

7. The method of claim 1, wherein receiving one or more tones comprises receiving one or more tones that are substantially inaudible to the human ear.

8. A mobile device operable to facilitate a payment transaction, the mobile device comprising:
    at least one microphone operable to receive, from a point of sale device, within a predetermined distance from the point of sale device, one or more tones output by the point of sale device and comprising embedded information associated with a proposed transaction;
    at least one communications interface operable to communicate a first request to approve the proposed transaction to a transaction processor; and
    at least one processor operable (i) to extract the received information from the one or more tones, (ii) transmit to a third-party processor, a second request for a risk analysis for the proposed transaction based at least in part on the extracted information, (iii) receive from the third-party processor, the risk analysis, (iv) to utilize at least a portion of the received information, the risk analysis, and an identifier associated with the mobile device to generate the first request to approve the proposed transaction and (v) to direct the communication of the generated first request to the transaction processor,
    wherein the transaction processor determines based at least in part on the risk analysis whether to approve the proposed transaction and communicates an approval or decline message to the point of sale device, and
    wherein account information associated with a user of the mobile device is not provided to the point of sale device or a merchant associated with the point of sale device.

9. The mobile device of claim 8, wherein the at least one communications interface comprises a communications interface operable to facilitate communication via a network.

10. The mobile device of claim 8, wherein the one or more tones are output by at least one speaker associated with the point of sale device.

11. The mobile device of claim 8, wherein the at least one communications interface is further operable to receive, from the transaction processor, an indication of whether the proposed transaction was approved or declined.

12. The mobile device of claim 8, further comprising:
at least one user input device operable to receive verification information from a user of the mobile device,
wherein the at least one processor is further operable to determine, based at least in part on the received verification information, whether the user is authorized to complete the proposed transaction using the mobile device and to generate the first request based at least in part on the determination.

13. The mobile device of claim 8, wherein the information associated with the proposed transaction comprises a transaction amount for the proposed transaction and an identifier associated with the point of sale device.

14. The mobile device of claim 8, wherein the identifier associated with the mobile device comprises one of a telephone number, a universal integrated circuit card (UICC) identifier, a universal device identifier (UDID), a subscriber identity module (SIM) card identifier, or an international subscriber identity (IMSI) number.

15. The mobile device of claim 8, further comprising:
at least one user input device operable to receive a user selection of a payment account to utilize for the proposed transaction,
wherein the first generated request to approve the proposed transaction further comprises an identifier of the selected payment account.

16. A method for facilitating a payment transaction requested by a mobile device, the method comprising:
receiving, at a transaction processor from a mobile device, a request to approve a proposed transaction, wherein the request is generated by the mobile device and comprises (i) an identifier associated with the mobile device (ii) a risk analysis provided by a third-party processor, and (iii) transaction information extracted by output by a point of sale device via one or more tones that are received by at least one microphone associated with the mobile device within a predetermined distance from the point of sale device, wherein account information associated with a user of the mobile device is not provided to the point of sale device or a merchant associated with the point of sale device;
identifying, by the transaction processor, a payment account to be utilized for the proposed transaction;
determining, by the transaction processor based at least in part on the received transaction information and based at least in part on the risk analysis, whether to approve the proposed transaction; and
communicating, by the transaction processor, an approval or decline message to the point of sale device.

17. The method of claim 16, wherein determining whether to approve the proposed transaction comprises conducting a risk assessment for the proposed transaction.

18. The method of claim 16, wherein the transaction information comprises a transaction amount for the proposed transaction and an identifier associated with the point of sale device.

19. The method of claim 16, further comprising:
facilitating, by the transaction processor, settlement of the proposed transaction when the proposed transaction is approved.

20. A system for facilitating a payment transaction, the system comprising:
at least one communications interface operable:
(i) to receive, from a mobile device using a network interface, a request to approve a proposed transaction, wherein the request is generated by the mobile device and comprises an identifier associated with the mobile device, the risk analysis, a risk analysis provided by a third-party processor, and transaction information output by a point of sale device via one or more tones that are received by at least one microphone associated with the mobile device within a predetermined distance from the point of sale device, wherein account information associated with a user of the mobile device is not provided to the point of sale device or a merchant associated with the point of sale device, and wherein the network interface comprises at least one of the following: a cellular network, a local area network, a wide area network, the Internet, a radio frequency network; and
(ii) to communicate via the network interface an approval or decline message to the point of sale device; and
at least one processor operable:
(i) to identify a payment account to be utilized for the proposed transaction, (ii) to determine, based at least in part on the received transaction information and the risk analysis, whether to approve the proposed transaction, and (iii) to direct the communication of the approval or decline message to the point of sale device.

21. A method for facilitating a payment transaction with a mobile device, the method comprising:
receiving, from a tone transmission device by a mobile device utilizing at least one microphone within a predetermined distance from the point of sale device, one or more tones output by the tone transmission device and comprising embedded information associated with a proposed transaction, wherein the information comprises an identifier of a merchant;
extracting, by the mobile device, the received information from the one or more tones;
transmitting, by the mobile device to a third-party processor, a first request for a risk analysis for the proposed transaction based at least in part on the received information;
receiving, by the mobile device from the third-party processor, the risk analysis;
generating, by the mobile device utilizing at least a portion of the received information, the risk analysis, and an identifier associated with the mobile device, a second request to approve the proposed transaction; and
communicating using a network interface, from the mobile device to a transaction processor, the second request to approve the proposed transaction,
wherein the network interface comprises at least one of the following: a cellular network, a local area network, a wide area network, the Internet, a radio frequency network, and
wherein the transaction processor determines based at least in part on the risk analysis whether to approve the proposed transaction and communicates an approval or decline message to the merchant, and
wherein account information associated with a user of the mobile device is not provided to the merchant.

* * * * *